(12) United States Patent
Kouda et al.

(10) Patent No.: US 12,540,245 B2
(45) Date of Patent: Feb. 3, 2026

(54) WATER REPELLENT COMPOSITION, METHOD FOR PRODUCING WATER REPELLENT COMPOSITION, AND FIBER PRODUCT

(71) Applicants: MITSUI CHEMICALS, INC., Tokyo (JP); DAIKIN INDUSTRIES, LTD., Osaka (JP)

(72) Inventors: Chikako Kouda, Sodegaura (JP); Kazuyuki Fukuda, Ichihara (JP); Keisuke Nakamura, Osaka (JP); Daisuke Noguchi, Osaka (JP); Masahiro Miyahara, Osaka (JP); Rumi Kawabe, Osaka (JP); Shinichi Minami, Osaka (JP)

(73) Assignees: MITSUI CHEMICALS, INC., Tokyo (JP); DAIKIN INDUSTRIES, LTD., Osaka (JP)

( * ) Notice: Subject to any disclaimer, the term of this patent is extended or adjusted under 35 U.S.C. 154(b) by 744 days.

(21) Appl. No.: 17/788,175

(22) PCT Filed: Dec. 21, 2020

(86) PCT No.: PCT/JP2020/047714
§ 371 (c)(1),
(2) Date: Jun. 22, 2022

(87) PCT Pub. No.: WO2021/132172
PCT Pub. Date: Jul. 1, 2021

(65) Prior Publication Data
US 2023/0037578 A1    Feb. 9, 2023

(30) Foreign Application Priority Data

Dec. 24, 2019   (JP) ................................. 2019-233550

(51) Int. Cl.
| | |
|---|---|
| *C08L 75/04* | (2006.01) |
| *C08G 18/08* | (2006.01) |
| *C08G 18/10* | (2006.01) |
| *C08G 18/28* | (2006.01) |
| *C08G 18/32* | (2006.01) |
| *C08G 18/62* | (2006.01) |
| *C08G 18/64* | (2006.01) |
| *C08L 33/08* | (2006.01) |
| *C08L 75/08* | (2006.01) |
| *C08L 91/06* | (2006.01) |
| *C09D 133/06* | (2006.01) |
| *C09D 133/08* | (2006.01) |
| *C09D 175/04* | (2006.01) |
| *C09K 3/18* | (2006.01) |
| *D06M 15/564* | (2006.01) |
| *C08L 101/00* | (2006.01) |
| *D06M 15/263* | (2006.01) |

(52) U.S. Cl.
CPC .......... *C08L 75/08* (2013.01); *C08G 18/0814* (2013.01); *C08G 18/10* (2013.01); *C08G 18/2825* (2013.01); *C08G 18/3275* (2013.01); *C08G 18/6225* (2013.01); *C08G 18/6469* (2013.01); *C08L 91/06* (2013.01); *C09D 133/062* (2013.01); *C09D 133/08* (2013.01); *C09D 175/04* (2013.01); *C09K 3/18* (2013.01); *D06M 15/564* (2013.01); *C08G 18/284* (2013.01); *C08L 101/005* (2013.01); *D06M 15/263* (2013.01)

(58) Field of Classification Search
None
See application file for complete search history.

(56) References Cited

U.S. PATENT DOCUMENTS

| | | |
|---|---|---|
| 2006/0155046 A1 | 7/2006 | Moors et al. |
| 2008/0194757 A1 | 8/2008 | Fujita et al. |
| 2008/0226829 A1 | 9/2008 | Choate |
| 2014/0295724 A1 | 10/2014 | Sworen et al. |
| 2015/0361300 A1 | 12/2015 | Sworen et al. |
| 2016/0090505 A1 | 3/2016 | Sworen et al. |
| 2019/0177908 A1 | 6/2019 | Coppens et al. |
| 2020/0017616 A1 | 1/2020 | Probst et al. |
| 2020/0239613 A1 | 7/2020 | Yamamoto et al. |
| 2022/0064851 A1 | 3/2022 | Tanaka et al. |

FOREIGN PATENT DOCUMENTS

| | | |
|---|---|---|
| CN | 109563339 A | 4/2019 |
| EP | 3460021 A1 | 3/2019 |
| JP | 2006328624 A | 12/2006 |
| JP | 2010521564 A | 6/2010 |
| JP | 2012136677 A | 7/2012 |
| JP | 2015120894 A | 7/2015 |
| JP | 2015120895 A | 7/2015 |
| JP | 2016524628 A | 8/2016 |
| JP | 2017-160354 A | 9/2017 |
| JP | 2017214664 A | 12/2017 |
| JP | 2017222827 A | 12/2017 |
| JP | 2017536439 A | 12/2017 |
| JP | 2019108641 A | 7/2019 |
| JP | 2019-173185 A | 10/2019 |
| JP | 2019533732 A | 11/2019 |
| JP | 2019534908 A | 12/2019 |
| WO | 2006038466 A1 | 4/2006 |
| WO | 2015111668 A1 | 7/2015 |
| WO | 2017199726 A1 | 11/2017 |

(Continued)

OTHER PUBLICATIONS

Indian Examination Report dated Nov. 22, 2022 for Indian Patent Application No. 202217035590.

*Primary Examiner* — David J Buttner
(74) *Attorney, Agent, or Firm* — RANKIN, HILL & CLARK LLP

(57) ABSTRACT

A water repellent composition includes a polyurethane resin compound, a non-fluorine water repellent compound, a surfactant, and a liquid medium. The polyurethane resin compound includes at least one kind selected from the group consisting of a first polyurethane resin compound, a second polyurethane resin compound, and a third polyurethane resin compound.

11 Claims, No Drawings

(56) References Cited

FOREIGN PATENT DOCUMENTS

| WO | 2019026593 | A1 | 2/2019 |
| WO | 2019240162 | A1 | 12/2019 |
| WO | 2020/137902 | A1 | 7/2020 |

WATER REPELLENT COMPOSITION, METHOD FOR PRODUCING WATER REPELLENT COMPOSITION, AND FIBER PRODUCT

TECHNICAL FIELD

The present invention relates to a water repellent composition, a method for producing a water repellent composition, and a fiber product, to be specific, to a water repellent composition, a method for producing the water repellent composition, and a fiber product which is a water repellent treatment product by the water repellent composition.

BACKGROUND ART

Conventionally, a fluorine-based water repellent containing a fluorine compound has been known as a water repellent. When the water repellent is treated with respect to a substrate such as a fiber product, it exhibits excellent water repellency.

On the other hand, in recent years, in consideration of the influence on environmental load due to fluorine, there has been an increasing demand for a non-fluorine-based water repellent containing no fluorine compound.

As such a non-fluorine-based water repellent, for example, a surface treatment agent including a non-fluorine polymer, a surfactant, and a liquid medium has been proposed (ref: for example, Patent Document 1).

CITATION LIST

Patent Document

Patent Document 1: Japanese Unexamined Patent Application Publication No. 2015-120894

SUMMARY OF THE INVENTION

Problem to be Solved by the Invention

Recently, there has been a demand for further improvement in water repellency for a non-fluorine-based water repellent.

The present invention provides a water repellent composition having excellent water repellency, a method for producing the water repellent composition, and a fiber product which is a water repellent treatment product by the water repellent composition.

Means for Solving the Problem

The present invention [1] includes a water repellent composition including a polyurethane resin compound, a non-fluorine water repellent compound, a surfactant, and a liquid medium, wherein the polyurethane resin compound includes at least one kind selected from the group consisting of the following (A) a first polyurethane resin compound, the following (B) a second polyurethane resin compound, and the following (C) a third polyurethane resin compound:

(A) A first polyurethane resin compound which is a reaction product of a first aliphatic polyisocyanate derivative having an average number of isocyanate groups of 2 or more, a first long-chain active hydrogen compound including a hydrocarbon group having 12 or more and 30 or less carbon atoms and an active hydrogen group in combination, a cationic active hydrogen compound including an active hydrogen group and a cationic group in combination, and an acid compound capable of a salt with the cationic group, and in which the concentration of the hydrocarbon group is 30% or more and 85% or less;

(B) A second polyurethane resin compound including a reaction product of an isocyanate compound and at least one kind selected from the group consisting of an alkyl sorbitan having an alkyl group having 12 or more and 30 or less carbon atoms, an alkyl citrate having an alkyl group having 12 or more and 30 or less carbon atoms, and a pentaerythritol ester having an alkyl group having 12 or more and 30 or less carbon atoms; and (C) A third polyurethane resin compound including a reaction product of a second aliphatic polyisocyanate derivative having an average number of isocyanate groups of 2 or more and a second long-chain active hydrogen compound including a hydrocarbon group having 12 or more and 30 or less carbon atoms and an active hydrogen group in combination.

The present invention [2] includes the water repellent composition described in the above-described [1], wherein a mixing ratio of the non-fluorine water repellent compound with respect to 100 parts by mass of the total amount of the polyurethane resin compound and the non-fluorine water repellent compound is 0.1 parts by mass or more and 99 parts by mass or less.

The present invention [3] includes the water repellent composition described in the above-described [1] or [2], wherein the non-fluorine water repellent compound is a polymer including a constituent unit derived from a long-chain aliphatic hydrocarbon group-containing (meth)acrylate shown by the following formula (1) and/or an amide group-containing monomer shown by the following formula (2).

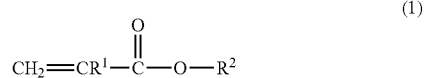

(In the above-described formula (1), $R^1$ represents a hydrogen atom or a methyl group, and $R^2$ represents a straight-chain or branched long-chain aliphatic hydrocarbon group having 18 or more and 30 or less carbon atoms.)

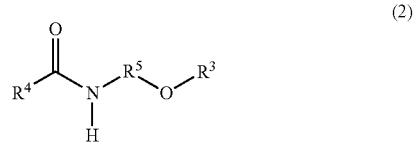

(In the above-described formula (2), $R^3$ represents an organic residue having an ethylenically unsaturated double bond group, $R^4$ represents a monovalent hydrocarbon group having 7 or more and 30 or less carbon atoms, and $R^5$ represents a divalent hydrocarbon group having 1 or more and 5 or less carbon atoms.)

The present invention [4] includes the water repellent composition described in the above-described [3], wherein the non-fluorine water repellent compound is a polymer including a constituent unit derived from a reactive emulsifier.

The present invention [5] includes the water repellent composition described in the above-described [4], wherein the reactive emulsifier is represented by the following formula (3).

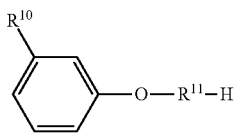

(3)

(In the above-described formula (3), $R^{10}$ represents an organic residue having an ethylenically unsaturated double bond group having 12 or more and 20 or less carbon atoms, and $R^{11}$ represents an oxyalkylene group having 2 or more and 10 or less carbon atoms.)

The present invention [6] includes the water repellent composition described in the above-described [1] or [2], wherein the non-fluorine water repellent compound is a dendrimer-based water repellent.

The present invention [7] includes the water repellent composition described in any one of the above-described [1] to [6] including at least one or more kinds selected from the group consisting of a blocked isocyanate compound, a silicone polymer, and a wax.

The present invention [8] includes the water repellent composition described in any one of the above-described [1] to [7], wherein the first aliphatic polyisocyanate derivative includes an isocyanurate derivative of an aliphatic polyisocyanate.

The present invention [9] includes the water repellent composition described in any one of the above-described [1] to [8], wherein in the cationic active hydrogen compound of the first polyurethane resin compound, the cationic group is a tertiary amino group, the active hydrogen group is a hydroxyl group, and the cationic active hydrogen compound has two or more hydroxyl groups per molecule.

The present invention [10] includes a method for producing a water repellent composition, the water repellent composition described in the above-described [3], producing a non-fluorine water repellent compound by polymerizing a monomer component in the presence of a polyurethane resin compound, a surfactant, and a liquid medium.

The present invention [11] includes a fiber product which is a water repellent treatment product by the water repellent composition described in any one of the above-described [1] to [8].

Effect of the Invention

The water repellent composition of the present invention includes a polyurethane resin compound including at least one kind selected from the group consisting of a first polyurethane resin compound, a second polyurethane resin compound, and a third polyurethane resin compound, and a non-fluorine water repellent compound.

Therefore, it is possible to improve the water repellency of a water repellent treatment product to be treated by the water repellent composition.

In the method for producing a water repellent composition of the present invention, a non-fluorine water repellent compound is produced by polymerizing a monomer component in the presence of a polyurethane resin compound, a surfactant, and a liquid medium.

Therefore, it is possible to produce a water repellent composition having excellent water repellency.

The fiber product of the present invention is a water repellent treatment product by the water repellent composition of the present invention.

Therefore, the fiber product has excellent water repellency.

DESCRIPTION OF EMBODIMENTS

A water repellent composition of the present invention includes a polyurethane resin compound, a non-fluorine water repellent compound, a surfactant, and a liquid medium.

Hereinafter, each component is described in detail.

1. Polyurethane Resin Compound

A polyurethane resin compound includes at least one kind selected from the group consisting of a first polyurethane resin compound, a second polyurethane resin compound, and a third polyurethane resin compound.

1-1. First Polyurethane Resin Compound

The first polyurethane resin compound is a reaction product of a first aliphatic polyisocyanate derivative, a first long-chain active hydrogen compound, a cationic active hydrogen compound, and an acid compound.

The first aliphatic polyisocyanate derivative is a derivative of an aliphatic polyisocyanate.

Examples of the aliphatic polyisocyanate include aliphatic diisocyanates such as hexamethylene diisocyanate (hexane diisocyanate) (HDI), pentamethylene diisocyanate (pentane diisocyanate) (PDI), tetramethylene diisocyanate, trimethylene diisocyanate, 1,2-, 2,3-, or 1,3-butylene diisocyanate, and 2,4,4-, or 2,2,4-trimethylhexamethylene diisocyanate.

Further, the aliphatic polyisocyanate includes an alicyclic polyisocyanate.

Examples of the alicyclic polyisocyanate include alicyclic diisocyanates such as 3-isocyanatomethyl-3,5,5-trimethyl-cyclohexylisocyanate (isophorone diisocyanate, IPDI), 4,4'-, 2,4'-, or 2,2'-methylenebis(cyclohexylisocyanate) or a mixture thereof ($H_{12}$MDI), 1,3- or 1,4-bis(isocyanatomethyl) cyclohexane or a mixture thereof ($H_6$XDI), bis(isocyanatomethyl)norbornane (NBDI), 1,3-cyclopentenediisocyanate, 1,4-cyclohexanediisocyanate, 1,3-cyclohexanediisocyanate, methyl-2,4-cyclohexanediisocyanate, and methyl-2,6-cyclohexanediisocyanate.

As the aliphatic polyisocyanate, preferably, hexamethylene diisocyanate and 1,3-bis(isocyanatomethyl)cyclohexane (hereinafter, simply referred to as bis(isocyanatomethyl) cyclohexane) are used. More preferably, hexamethylene diisocyanate is used.

Examples of the first aliphatic polyisocyanate derivative include multimers (for example, dimers, trimers (for example, isocyanurate derivative, iminooxadiazine dione derivative), pentamers, heptamers, etc.), allophanate derivatives (for example, allophanate derivative produced by a reaction of the above-described aliphatic polyisocyanate with a monohydric alcohol or a dihydric alcohol etc.), polyol derivatives (for example, polyol derivative produced by a reaction of the above-described aliphatic polyisocyanate with a trihydric alcohol (for example, trimethylolpropane etc.) (alcohol adduct, preferably trimethylolpropane adduct, etc.)), biuret derivatives (for example, biuret derivative produced by a reaction of the above-described aliphatic polyisocyanate with water or amines, etc.), urea derivatives (for example, urea derivative produced by a reaction of the above-described aliphatic polyisocyanate with diamine etc.), oxadiazinetrione derivatives (for example, oxadiazinetrione produced by a reaction of the above-described aliphatic polyisocyanate with carbon dioxide etc.), carbodiimide derivatives (carbodiimide derivative produced by a decarboxylation condensation reaction of the above-described aliphatic polyisocyanate etc.), uretdione derivatives, and uretonimine derivatives of the above-described aliphatic polyisocyanate.

As the first aliphatic polyisocyanate derivative, preferably, an isocyanurate derivative is used.

When the first aliphatic polyisocyanate derivative includes the isocyanurate derivative, the texture becomes excellent.

As the first aliphatic polyisocyanate derivative, more preferably, an isocyanurate derivative of hexamethylene diisocyanate is used.

These first aliphatic polyisocyanate derivatives may be used alone or in combination of two or more.

Further, the first aliphatic polyisocyanate derivative can be produced by a known method.

The first aliphatic polyisocyanate derivative has an average number of isocyanate groups of 2 or more, preferably 2.5 or more, more preferably 2.9 or more, and for example, 3.8 or less.

When the above-described average number of isocyanate groups is the above-described lower limit or more, it is possible to improve the water repellency of a water repellent treatment product to be treated by the water repellent composition.

A method for measuring the average number of isocyanate groups is described in detail in Examples to be described later.

Further, when two or more kinds of first aliphatic polyisocyanate derivatives are used in combination, the above-described average number of isocyanate groups is calculated by a weight ratio of the first aliphatic polyisocyanate derivative, and the average number of isocyanate functional groups thereof.

The first long-chain active hydrogen compound includes a hydrocarbon group having 12 or more and 30 or less carbon atoms, and an active hydrogen group reacting with the first aliphatic polyisocyanate derivative in combination.

Examples of the hydrocarbon group having 12 or more and 30 or less carbon atoms include a straight-chain or branched-chain saturated hydrocarbon group having 12 or more and 30 or less carbon atoms (for example, an alkyl group etc.), and a straight-chain or branched-chain unsaturated hydrocarbon group having 12 or more and 30 or less carbon atoms (for example, an alkenyl group etc.).

An example of the active hydrogen group includes a hydroxyl group.

Examples of the first long-chain active hydrogen compound including a hydrocarbon group and an active hydrogen group in combination include a straight-chain saturated hydrocarbon group-containing active hydrogen compound, a branched-chain saturated hydrocarbon group-containing active hydrogen compound, a straight-chain unsaturated hydrocarbon group-containing active hydrogen compound, and a branched-chain unsaturated hydrocarbon group-containing active hydrogen compound.

The straight-chain saturated hydrocarbon group-containing active hydrogen compound is an active hydrogen compound including a straight-chain saturated hydrocarbon group having 12 or more and 30 or less carbon atoms, and examples thereof include straight-chain saturated hydrocarbon group-containing alcohols such as n-tridecanol, n-tetradecanol, n-pentadecanol, n-hexadecanol, n-heptadecanol, n-octadecanol (stearyl alcohol), n-nonadecanol, and eicosanol, and straight-chain saturated hydrocarbon group-containing sorbitan esters such as sorbitan tristearate.

The branched-chain saturated hydrocarbon group-containing active hydrogen compound is an active hydrogen compound including a branched-chain saturated hydrocarbon group having 12 or more and 30 or less carbon atoms, and examples thereof include branched-chain saturated hydrocarbon group-containing alcohols such as isomyristyl alcohol, isocetyl alcohol, isostearyl alcohol, and isoeicosyl alcohol.

The straight-chain unsaturated hydrocarbon group-containing active hydrogen compound is an active hydrogen compound including a straight-chain unsaturated hydrocarbon group having 12 or more and 30 or less carbon atoms, and examples thereof include straight-chain unsaturated hydrocarbon group-containing alcohols such as tetradecenyl alcohol, hexadecenyl alcohol, oleyl alcohol, icosenyl alcohol, docosenyl alcohol, tetracosenyl alcohol, hexacosenyl alcohol, and octacosenyl alcohol.

The branched-chain unsaturated hydrocarbon group-containing active hydrogen compound is an active hydrogen compound including a branched-chain unsaturated hydrocarbon group having 12 or more and 30 or less carbon atoms, and an example thereof includes phytol.

As the first long-chain active hydrogen compound, preferably, a straight-chain saturated hydrocarbon group-containing active hydrogen compound and a straight-chain unsaturated hydrocarbon group-containing active hydrogen compound are used.

These first long-chain active hydrogen compounds may be used alone or in combination of two or more. Preferably, a straight-chain saturated hydrocarbon group-containing active hydrogen compound and a straight-chain unsaturated hydrocarbon group-containing active hydrogen compound are used in combination. More preferably, a straight-chain saturated hydrocarbon group-containing alcohol and a straight-chain unsaturated hydrocarbon group-containing alcohol are used in combination. Even more preferably, a stearyl alcohol and an oleyl alcohol are used in combination.

When the straight-chain saturated hydrocarbon group-containing alcohol and the straight-chain unsaturated hydrocarbon group-containing alcohol are used in combination, the mixing ratio of the straight-chain saturated hydrocarbon group-containing alcohol with respect to 100 parts by mass of the total amount of the straight-chain saturated hydrocarbon group-containing alcohol and the straight-chain unsaturated hydrocarbon group-containing alcohol is, for example, 40 parts by mass or more, preferably 55 parts by mass or more, more preferably 70 parts by mass or more, and for example, 90 parts by mass or less, preferably 80 parts by mass or less. Further, the mixing ratio of the straight-chain unsaturated hydrocarbon group-containing alcohol with respect to 100 parts by mass of the total amount of the straight-chain saturated hydrocarbon group-containing alcohol and the straight-chain unsaturated hydrocarbon group-containing alcohol is, for example, 10 parts by mass or more, preferably 20 parts by mass or more, and for example, 60 parts by mass or less, preferably 45 parts by mass or less, more preferably 30 parts by mass or less.

When the mixing ratio of the straight-chain saturated hydrocarbon group-containing alcohol is the above-described lower limit or more, the crystallinity of the hydrocarbon group is improved, and as a result, it is possible to improve the water repellency of the water repellent treatment product to be treated by the water repellent composition.

The cationic active hydrogen compound includes an active hydrogen group and a cationic group in combination.

The active hydrogen group is, as described above, an active hydrogen group which reacts with the first aliphatic polyisocyanate derivative, and an example thereof includes a hydroxyl group.

Further, the cationic active hydrogen compound preferably has two or more hydroxyl groups per molecule.

An example of the cationic group includes a tertiary amino group.

In other words, the cationic active hydrogen compound preferably includes two or more hydroxyl groups per molecule, as an active hydrogen group, and a tertiary amino group, as a cationic group, in combination.

According to such a cationic active hydrogen compound, excellent dispersibility of the first polyurethane resin compound to water can be imparted, and also, a cationic group having affinity for fiber products (described later) can be introduced into the resin, so that the washing durability (described later) can be improved.

More preferably, the cationic active hydrogen compound includes two hydroxyl groups per molecule, as an active hydrogen group, and a tertiary amino group, as a cationic group, in combination.

Examples of such a cationic active hydrogen compound include alkyldialkanolamines such as N-methyldiethanolamine, N-ethyldiethanolamine, N-propyldiethanolamine, N-butyldiethanolamine, and N-methyldipropanolamine, and preferably, N-methyldiethanolamine is used.

These cationic active hydrogen compounds may be used alone or in combination of two or more.

The acid compound is a compound capable of a salt with the cationic group.

Examples of the acid compound include an organic acid and an inorganic acid.

Examples of the organic acid include acetic acid, lactic acid, tartaric acid, and malic acid, and preferably, an acetic acid and a lactic acid are used. More preferably, an acetic acid is used.

Examples of the inorganic acid include hydrochloric acid, sulfuric acid, and phosphorus acid, and preferably, a hydrochloric acid is used.

As the acid compound, preferably, an organic acid is used.

When the acid compound includes the organic acid, from the viewpoint of lowering the ionic properties and improving the water resistance due to volatilization of the acid by heat treatment, it is possible to improve the water repellency of the water repellent treatment product to be treated by the water repellent composition. Further, since the acid is volatilized by the heat treatment, it is possible to improve the washing durability against the fiber products (described later) from the viewpoint that the cationic group is easily adsorbed on the fiber products.

These acid compounds may be used alone or in combination of two or more.

Then, in order to obtain a first polyurethane resin compound, a first aliphatic polyisocyanate derivative, a first long-chain active hydrogen compound, a cationic active hydrogen compound, and an acid compound are reacted.

In order to react the first aliphatic polyisocyanate derivative, the first long-chain active hydrogen compound, the cationic active hydrogen compound, and the acid compound, first, the first long-chain active hydrogen compound is blended into the first aliphatic polyisocyanate derivative, and the first aliphatic polyisocyanate derivative and the first long-chain active hydrogen compound are reacted.

At this time, the first long-chain active hydrogen compound is blended so that, for example, when the average number of isocyanate groups of the isocyanurate derivative of the aliphatic polyisocyanate is 3, preferably, among the isocyanurate derivatives of the aliphatic polyisocyanate, the two isocyanate groups are modified to a hydrocarbon group having 12 or more and 30 or less carbon atoms by the first long-chain active hydrogen compound, and among the isocyanurate derivatives of the aliphatic polyisocyanate, the one isocyanate group remains and the isocyanurate derivative of the unreacted aliphatic polyisocyanate does not remain.

Specifically, the first long-chain active hydrogen compound is blended into the first aliphatic polyisocyanate derivative so that an equivalent ratio (isocyanate group/active hydrogen group) of the isocyanate group to the active hydrogen group is, for example, 1.2 or more, preferably 1.5 or more, and for example, 2.0 or less.

Thus, a molecule terminal of the reaction product (hereinafter, referred to as a first intermediate reaction product) of the first aliphatic polyisocyanate derivative and the first long-chain active hydrogen compound becomes a hydrocarbon group having 12 or more and 30 or less carbon atoms and an isocyanate group.

Further, the above-described reaction is carried out under a nitrogen atmosphere. In addition, the reaction conditions include a reaction temperature of, for example, 70° C. or more and 120° C. or less, and the reaction time of 1 hour or more and 6 hours or less.

In addition, the above-described reaction is carried out until the isocyanate concentration of the first intermediate reaction product reaches a predetermined calculated value.

The isocyanate concentration can be measured by an n-dibutylamine method in conformity with JIS K-1556 using a potentiometric titrator.

In addition, in the above-described reaction, a known solvent such as methyl ethyl ketone may be also blended at an appropriate ratio.

Then, the cationic active hydrogen compound is blended into a reaction liquid including the first intermediate reaction product, and the first intermediate reaction product and the cationic active hydrogen compound are reacted.

At this time, the cationic active hydrogen compound is blended into the first intermediate reaction product so that the equivalent ratio (isocyanate group/active hydrogen group) of the isocyanate group to the active hydrogen group of the cationic active hydrogen compound is, for example, 0.95 or more, and for example, 1.05 or less.

Further, the above-described reaction is carried out under a nitrogen atmosphere. In addition, the reaction conditions include a reaction temperature of, for example, 70° C. or more and 120° C. or less, and the reaction time of 0.5 hours or more and 4 hours or less.

Further, the above-described reaction is carried out until the reaction of the first intermediate reaction product and the cationic active hydrogen compound is completed.

In addition, in the above-described reaction, a known solvent such as methyl ethyl ketone may be blended at an appropriate ratio.

In this manner, a reaction product (hereinafter, referred to as a second intermediate reaction product) of the first intermediate reaction product and the cationic active hydrogen compound is obtained.

The second intermediate reaction product has a hydrocarbon group having 12 or more and 30 or less carbon atoms, and a cationic group.

Next, an acid compound is blended into the second intermediate reaction product.

The mixing ratio of the acid compound with respect to 1 mol of the cationic group of the cationic active hydrogen compound is, for example, 0.5 mol or more, preferably 3 mol or more, and for example, 10 mol or less, preferably 4 mol or less.

In this manner, the acid compound forms the cationic group and salt of the second intermediate reaction product, and a reaction liquid including the reaction product of the first aliphatic polyisocyanate derivative, the first long-chain active hydrogen compound, the cationic active hydrogen compound, and the acid compound is obtained.

The above-described reaction product has a hydrocarbon group having 12 or more and 30 or less carbon atoms, and has a cationic group.

Further, since the above-described reaction product has the hydrocarbon group having 12 or more and 30 or less carbon atoms, it can be self-dispersed (self-emulsified) in water regardless of a dispersant (emulsifier). In other words, the above-described reaction product can be internally emulsified.

Next, water is added to the reaction liquid and emulsified, while the temperature of the reaction liquid is kept at, for example, 50° C. or more and 100° C. or less.

Thereafter, the solvent is removed from the reaction liquid.

In this manner, an aqueous dispersion liquid (aqueous dispersion liquid of the first polyurethane resin compound) including the above-described reaction product is obtained.

The solid content concentration of the aqueous dispersion liquid is, for example, 10% by mass or more, and for example, 30% by mass or less.

In addition, in such a polyurethane resin compound, the concentration of the hydrocarbon group is 30% or more, and 85% or less, preferably 50%.

When the concentration of the hydrocarbon group is the above-described lower limit or more, it is possible to improve the water repellency of the water repellent treatment product to be treated by the water repellent composition.

On the other hand, when the concentration of the hydrocarbon group is below the above-described lower limit, the water repellency of the water repellent treatment product to be treated by the water repellent composition decreases.

Further, when the concentration of the hydrocarbon group is the above-described upper limit or less, the stability of the polyurethane resin can be improved.

On the other hand, when the concentration of the hydrocarbon group is above the above-described upper limit, the stability of the polyurethane resin decreases.

The concentration of the above-described hydrocarbon group can be calculated from a charging amount of each component described above.

In the above-described description, first, the first aliphatic polyisocyanate derivative and the first long-chain active hydrogen compound are reacted to obtain the reaction liquid including the first intermediate reaction product; next, the first intermediate reaction product and the cationic active hydrogen compound are reacted to obtain the reaction liquid including the second intermediate reaction product; and next, the second intermediate reaction product and the acid compound are reacted. However, the order of the reaction is not particularly limited, and for example, the first aliphatic polyisocyanate derivative and the cationic active hydrogen compound are reacted, and thereafter, the first long-chain active hydrogen compound and the acid compound may be also reacted. Further, the first aliphatic polyisocyanate derivative, the first long-chain active hydrogen compound, the cationic active hydrogen compound, and the acid compound may be also collectively blended to be reacted.

1-2. Second Polyurethane Resin Compound

The second polyurethane resin compound includes a reaction product of an isocyanate compound, and at least one kind selected from the group consisting of an alkyl sorbitan having an alkyl group having 12 or more and 30 or less carbon atoms (hereinafter, may be simply referred to as an alkyl sorbitan), an alkyl citrate having an alkyl group having 12 or more and 30 or less carbon atoms (hereinafter, may be simply referred to as an alkyl citrate), and a pentaerythritol ester having an alkyl group having 12 or more and 30 or less carbon atoms (hereinafter, may be simply referred to as a pentaerythritol ester).

1-2-1. Isocyanate Compound

Examples of the isocyanate compound include polyisocyanates such as aromatic polyisocyanates, araliphatic polyisocyanates, and aliphatic polyisocyanates.

Examples of the aromatic polyisocyanate include aromatic diisocyanates such as 4,4'-, 2,4'-, or 2,2'-diphenylmethane diisocyanate or a mixture thereof (MDI), 2,4- or 2,6-tolylene diisocyanate or a mixture thereof (TDI), o-tolidine diisocyanate, 1,5-naphthalene diisocyanate (NDI), m- or p-phenylene diisocyanate or a mixture thereof, 4,4'-diphenyl diisocyanate, and 4,4'-diphenylether diisocyanate.

Examples of the araliphatic polyisocyanate include araliphatic diisocyanates such as 1,3- or 1,4-bis(isocyanatomethyl)benzene (also known as 1,3- or 1,4-xylylene diisocyanate) or a mixture thereof (XDI), 1,3- or 1,4-tetramethylxylylene diisocyanate or a mixture thereof (TMXDI), and ω,ω'-diisocyanate-1,4-diethylbenzene.

An example of the aliphatic polyisocyanate includes the above-described aliphatic polyisocyanate of the first polyurethane resin compound.

As the polyisocyanate, preferably, an aliphatic polyisocyanate is used. More preferably, hexamethylene diisocyanate is used.

Further, an example of the polyisocyanate includes a polyisocyanate derivative. An example of the polyisocyanate derivative includes the above-described polyisocyanate derivative of the first polyurethane resin compound, and preferably, a biuret derivative is used.

As the isocyanate compound, more preferably, a biuret derivative of hexamethylene diisocyanate is used.

These isocyanate compounds may be used alone or in combination of two or more.

1-2-2. Alkyl Sorbitan

The alkyl sorbitan is a reaction product (sorbitan ester) of a sorbitan and a carboxylic acid having an alkyl group having 12 or more and 30 or less carbon atoms.

Examples of the sorbitan include 1,4-sorbitan, 2,5-sorbitan, and 3,6-sorbitan, and preferably, 1,4-sorbitan is used.

These sorbitans may be used alone or in combination of two or more.

Examples of the carboxylic acid having an alkyl group having 12 or more and 30 or less carbon atoms include straight-chain saturated carboxylic acids having an alkyl group having 12 or more and 30 or less carbon atoms such as lauric acid (dodecanoic acid), myristic acid (detradecanoic acid), palmitic acid (hexadecanoic acid), stearic acid (octadecanoic acid), and behenic acid (docosanoic acid); and branched saturated carboxylic acids having an alkyl group having 12 or more and 30 or less carbon atoms such as isostearic acid (2-heptylundecanoic acid). Preferably, a straight-chain saturated carboxylic acid having an alkyl group having 12 or more and 30 or less carbon atoms is used. More preferably, a stearic acid is used.

These carboxylic acids having an alkyl group having 12 or more and 30 or less carbon atoms may be used alone or in combination of two or more.

Then, the alkyl sorbitan is obtained by subjecting the sorbitan and the carboxylic acid having an alkyl group having 12 or more and 30 or less carbon atoms to an esterification reaction.

Specifically, in the above-described reaction, an equivalent ratio of a hydroxyl group of the sorbitan to a carboxyl group of the carboxylic acid is adjusted so that one or more and three or less hydroxyl groups among the four hydroxyl groups of the sorbitan, and the carboxyl group of the carboxylic acid having an alkyl group having 12 or more and 30 or less carbon atoms react with each other. Therefore, the obtained alkyl sorbitan has at least one hydroxyl group.

Then, as such an alkyl sorbitan, preferably, sorbitan monostearate (preferably 1,4-sorbitan monostearate) and sorbitan tristearate (preferably 1,4-sorbitan tristearate) are used.

These alkyl sorbitans may be used alone or in combination of two or more, and preferably, a sorbitan monostearate and a sorbitan tristearate are used in combination.

When the sorbitan monostearate and the sorbitan tristearate are used in combination, the mixing ratio of the sorbitan monostearate with respect to 100 parts by mass of the total amount of the sorbitan monostearate and the sorbitan tristearate is, for example, 10 parts by mass or more, and for example, 50 parts by mass or less. Further, the mixing ratio of the sorbitan tristearate with respect to 100 parts by mass of the total amount of the sorbitan monostearate and the sorbitan tristearate is, for example, 10 parts by mass or more, and for example, 50 parts by mass or less.

1-2-2. Alkyl Citrate

The alkyl citrate is a reaction product (citric acid ester) of a citric acid and an alcohol having an alkyl group having 12 or more and 30 or less carbon atoms.

Examples of the alcohol having an alkyl group having 12 or more and 30 or less carbon atoms include straight-chain monohydric alcohols having an alkyl group having 12 or more and 30 or less carbon atoms such as lauryl alcohol, cetyl alcohol, stearyl alcohol, behenyl alcohol, and lanolin alcohol, and branched monohydric alcohols having an alkyl group having 12 or more and 30 or less carbon atoms such as isostearyl alcohol, 2-octyldodecanol, and 2-decyltetradecanol.

Then, the alkyl citrate is obtained by subjecting the citric acid and the alcohol having an alkyl group having 12 or more and 30 or less carbon atoms to an esterification reaction by a known method.

1-2-3. Pentaerythritol Ester

The pentaerythritol ester is a reaction product of a pentaerythritol and a carboxylic acid having an alkyl group having 12 or more and 30 or less carbon atoms.

The above-described carboxylic acid having an alkyl group having 12 or more and 30 or less carbon atoms is the same as the carboxylic acid having an alkyl group having 12 or more and 30 or less carbon atoms described in the alkyl sorbitan.

Then, the pentaerythritol ester is obtained by subjecting the pentaerythritol and the carboxylic acid having an alkyl group having 12 or more and 30 or less carbon atoms to an esterification reaction by a known method.

Specifically, in the above-described reaction, the equivalent ratio of the hydroxyl group of the pentaerythritol ester to the carboxyl group of the carboxylic acid having an alkyl group having 12 or more and 30 or less carbon atoms is adjusted so that one or more and three or less hydroxyl groups among the four hydroxyl groups of the pentaerythritol ester and the carboxyl group of the carboxylic acid having an alkyl group having 12 or more and 30 or less carbon atoms react with each other. Therefore, the obtained pentaerythritol ester has at least one hydroxyl group.

1-2-4. Reaction of Isocyanate Compound, with at Least One Kind Selected from Group Consisting of Alkyl Sorbitan, Alkyl Citrate, and Pentaerythritol Ester In order to react an isocyanate compound with at least one kind selected from the group consisting of an alkyl sorbitan, an alkyl citrate, and a pentaerythritol ester, the isocyanate compound is blended into at least one kind selected from the group consisting of the alkyl sorbitan, the alkyl citrate, and the pentaerythritol ester so that an equivalent ratio (isocyanate group/active hydrogen group (hydroxyl group)) of the isocyanate group to the active hydrogen group (hydroxyl group) is, for example, 0.9 or more and 1.2 or less.

Thus, the reaction product of the isocyanate compound, and at least one kind selected from the group consisting of the alkyl sorbitan, the alkyl citrate, and the pentaerythritol ester is obtained.

In the above-described reaction, if necessary, a known catalyst (preferably, a tin catalyst such as dibutyltin dilaurate) can be blended at an appropriate ratio.

In addition, in the above-described reaction, if necessary, a known organic solvent (preferably, 4-methyl-2-pentanone) can be blended at an appropriate ratio. In such a case, a reaction liquid including a reaction product of the isocyanate compound, and at least one kind selected from the group consisting of the alkyl sorbitan, the alkyl citrate, and the pentaerythritol ester is obtained.

In addition, in the above-described reaction, the reaction conditions include a reaction temperature of, for example, 40° C. or more, and for example, 90° C. or less, and the reaction time of, for example, 1 hour or more, and for example, 6 hours or less.

Next, water and an emulsifier (preferably, a cationic emulsifier) are added to the reaction liquid and emulsified, while the temperature of the reaction liquid is kept at, for example, 50° C. or more and 100° C. or less.

Thereafter, the solvent is removed from the reaction liquid.

In this manner, an aqueous dispersion liquid including the reaction product of the isocyanate compound, and at least one kind selected from the group consisting of the alkyl sorbitan, the alkyl citrate, and the pentaerythritol ester is obtained.

The solid content concentration of the above-described dispersion liquid is, for example, 10% by mass or more, and for example, 40% by mass or less.

Of the reaction products, preferably, a reaction product of the isocyanate compound and the alkyl sorbitan is used.

1-3. Third Polyurethane Resin Compound

The third polyurethane resin compound includes a reaction product of a second aliphatic polyisocyanate derivative and a second long-chain active hydrogen compound.

As the second aliphatic polyisocyanate derivative, the same aliphatic polyisocyanate derivative as the first aliphatic polyisocyanate derivative of the first polyurethane resin compound described above is used, and preferably, a biuret derivative of hexamethylene diisocyanate is used.

These second aliphatic polyisocyanate derivatives may be used alone or in combination of two or more.

The second aliphatic polyisocyanate derivative has an average number of isocyanate groups of 2 or more, preferably 2.5 or more, more preferably 2.9 or more, and for example, 3.8 or less.

When the above-described average number of isocyanate groups is the above-described lower limit or more, it is possible to improve the water repellency of the water repellent treatment product to be treated by the water repellent composition.

The second long-chain active hydrogen compound includes the hydrocarbon group having 12 or more and 30 or less carbon atoms and the active hydrogen group reacting with the second aliphatic polyisocyanate derivative in combination.

As the hydrocarbon group having 12 or more and 30 or less carbon atoms, for example, the same hydrocarbon group as the hydrocarbon group having 12 or more and 30 or less carbon atoms of the first polyurethane resin compound described above is used.

An example of the active hydrogen group includes a hydroxyl group.

As the second long-chain active hydrogen compound, for example, the same long-chain active hydrogen compound as the first long-chain active hydrogen compound of the first polyurethane resin compound described above is used. Preferably, a straight-chain saturated hydrocarbon group-containing active hydrogen compound is used. More preferably, a stearyl alcohol is used.

Then, in order to react the second aliphatic polyisocyanate derivative with the second long-chain active hydrogen compound, the second aliphatic polyisocyanate derivative is blended into the second long-chain active hydrogen compound so that the equivalent ratio (isocyanate group/active hydrogen group (hydroxyl group)) of the isocyanate group to the active hydrogen group (hydroxyl group) is, for example, 0.9 or more and 1.2 or less.

Thus, a reaction product of the second aliphatic polyisocyanate derivative and the second long-chain active hydrogen compound is obtained.

In addition, in the above-described reaction, if necessary, a known organic solvent (methyl ethyl ketone) can be blended at an appropriate ratio. In such a case, a reaction liquid including a reaction product of the second aliphatic polyisocyanate derivative and the second long-chain active hydrogen compound is obtained.

In addition, in the above-described reaction, the reaction conditions include a reaction temperature of, for example, 40° C. or more and for example, 90° C. or less, and the reaction time of, for example, 1 hour or more and for example, 6 hours or less.

Next, water and an emulsifier (preferably, a cationic emulsifier) are added to the reaction liquid and emulsified, while the temperature of the reaction liquid is kept at, for example, 50° C. or more and 100° C. or less.

Thereafter, the solvent is removed from the reaction liquid.

In this manner, an aqueous dispersion liquid including the reaction product of the second aliphatic polyisocyanate derivative and the second long-chain active hydrogen compound is obtained.

The solid content concentration of the above-described dispersion liquid is, for example, 10% by mass or more, and for example, 40% by mass or less.

Then, as described above, the polyurethane resin compound includes at least one kind selected from the group consisting of the above-described first polyurethane resin compound, the above-described second polyurethane resin compound, and the above-described third polyurethane resin compound, and preferably includes any one kind selected from the group consisting of the above-described first polyurethane resin compound, the above-described second polyurethane resin compound, and the above-described third polyurethane resin compound. Even more preferably, from the viewpoint of improving the water repellency of the water repellent treatment product to be treated by the water repellent composition, the polyurethane resin compound includes the first polyurethane resin compound.

In particular, when the polyurethane resin compound includes the first polyurethane resin compound, in a case where the non-fluorine water repellent compound is an acrylic polymer (specifically, a polymer including a constituent unit derived from a long-chain aliphatic hydrocarbon group-containing (meth)acrylate (described later)), the water repellency to a urethane/polyester mixed cloth or the like is improved.

The mixing ratio of the polyurethane resin compound with respect to 100 parts by mass of the total amount of the polyurethane resin compound and the non-fluorine water repellent compound is, for example, 0.1 parts by mass or more, preferably 2 parts by mass or more, more preferably 4 parts by mass or more, and for example, 99.9 parts by mass or less, preferably 70 parts by mass or less, more preferably 50 parts by mass or less, even more preferably 30 parts by mass or less, particularly preferably 15 parts by mass or less.

2. Non-Fluorine Water Repellent Compound

The non-fluorine water repellent compound is a compound having water repellency containing no fluorine atom, and is, for example, a polymer including a constituent unit derived from a long-chain aliphatic hydrocarbon group-containing (meth)acrylate and/or an amide group-containing monomer.

Such a non-fluorine water repellent compound is obtained by polymerizing a monomer component containing a long-chain aliphatic hydrocarbon group-containing (meth)acrylate and/or an amide group-containing monomer.

The long-chain aliphatic hydrocarbon group-containing (meth)acrylate is a long-chain aliphatic hydrocarbon group-containing methacrylate and/or a long-chain aliphatic hydrocarbon group-containing acrylate, and is represented by the following formula (1)

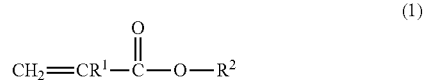

$$CH_2=CR^1-\overset{O}{\underset{\|}{C}}-O-R^2 \qquad (1)$$

In the above-described formula (1), $R^1$ represents a hydrogen atom or a methyl group.

In the above-described formula (1), $R^2$ represents a straight-chain or branched long-chain aliphatic hydrocarbon group having 18 or more 30 or less carbon atoms, and preferably a straight-chain alkyl group having 18 or more and 30 or less carbon atoms.

Specific examples of the long-chain aliphatic hydrocarbon group-containing (meth)acrylate include stearyl (meth)acrylate and behenyl (meth)acrylate. Preferably, stearyl (meth)acrylate is used. More preferably, stearyl acrylate is used.

These long-chain aliphatic hydrocarbon group-containing (meth)acrylates may be used alone or in combination of two or more.

The amide group-containing monomer is represented by the following formula (2).

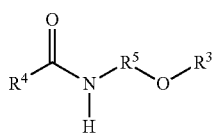

(2)

In the above-described formula (2), $R^3$ represents an organic residue having an ethylenically unsaturated double bond group, and is not particularly limited as log as there is a double bond between the carbons.

Examples of $R^3$ include $-C(=O)CR^{21}=CH_2$, $-CHR^{21}=CH_2$, and $-CH_2CHR^{21}=CH_2$. Examples of $R^{21}$ include a hydrogen atom or an alkyl group having 1 or more and 4 or less carbon atoms.

That is, when $R^{21}$ is a hydrogen atom, $-C(=O)CR^{21}=CH_2$ is an acryloyl group, $-CHR^{21}=CH_2$ is a vinyl group, and $-CH_2CHR^{21}=CH_2$ is an allyl group.

Further, $R^3$ includes at least an ethylenically unsaturated double bond group, but in addition, may also include various organic groups. For example, $R^3$ may include an ethylenically unsaturated double bond group, and organic groups such as chain hydrocarbon group, cyclic hydrocarbon group, polyoxyalkylene group, and polysiloxane group (including those substituted with various substituents, except those containing fluorine atoms) in combination.

In the above-described formula (2), $R^4$ represents a monovalent hydrocarbon group having 7 or more and 30 or less (preferably 11 or more, more preferably 15 or more, and preferably 27 or less, more preferably 23 or less) carbon atoms. Preferably, a chain hydrocarbon group and a cyclic hydrocarbon group are used. More preferably, a chain hydrocarbon group is used. Even more preferably, a straight-chain saturated hydrocarbon group is used.

In the above-described formula (2), $R^5$ represents a divalent hydrocarbon group having 1 or more and 5 or less carbon atoms, and preferably, a chain hydrocarbon group is used. More preferably, a straight-chain hydrocarbon group (saturated hydrocarbon group or unsaturated hydrocarbon group) and a branched hydrocarbon group (saturated hydrocarbon group or unsaturated hydrocarbon group) are used.

Examples of the amide group-containing monomer include amide group-containing (meth)acrylates such as palmitic acid amide ethyl (meth)acrylate, stearic acid amide ethyl (meth)acrylate, behenitic acid amide ethyl (meth)acrylate, myristic acid amide ethyl (meth)acrylate, lauric acid amide ethyl (meth)acrylate, isostearic acid ethylamide (meth)acrylate, oleic acid ethylamide (meth)acrylate, t-butylcyclohexylcaproic acid amide ethyl (meth)acrylate, adamantan carboxylic acid ethylamide (meth)acrylate, naphthalene carboxylic acid amide ethyl (meth)acrylate, anthracene carboxylic acid amide ethyl (meth)acrylate, palmitic acid amide propyl (meth)acrylate, and stearic acid amide propyl (meth)acrylate; amide group-containing vinyl ethers such as palmitic acid amide ethyl vinyl ether and stearic acid amide ethyl vinyl ether; and amide group-containing allyl ethers such as palmitic acid amide ethyl allyl ether and stearic acid amide ethyl allyl ether. Preferably, an amide group-containing (meth)acrylate is used. More preferably, a palmitic acid amide ethyl (meth)acrylate and a stearic acid amide ethyl (meth)acrylate are used, or they are used in combination.

When the palmitic acid amide ethyl (meth)acrylate and the stearic acid amide ethyl (meth)acrylate are used in combination, a ratio of the stearic acid amide ethyl (meth)acrylate with respect to the total amount of these is, for example, 55% by mass or more, preferably 60% by mass or more, more preferably 65% by mass or more, and for example, 99% by mass or less, preferably 85% by mass or less, more preferably 80% by mass or less.

These amide group-containing monomers may be used alone or in combination of two or more.

Further, if necessary, the above-described monomer component may also include a short-chain aliphatic hydrocarbon group-containing (meth)acrylate.

The short-chain aliphatic hydrocarbon group-containing (meth)acrylate is represented by the following formula (3).

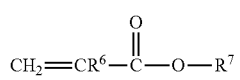

(3)

In the above-described formula (3), $R^6$ represents a hydrogen atom or a methyl group.

In the above-described formula (3), $R^7$ represents a straight-chain or branched short-chain aliphatic hydrocarbon group having 17 or less carbon atoms (for example, a straight-chain alkyl group having 17 or less carbon atoms, or a branched alkyl group having 17 or less carbon atoms).

Specific examples of the short-chain aliphatic hydrocarbon group-containing (meth)acrylate include methyl (meth)acrylate, ethyl (meth)acrylate, isopropyl (meth)acrylate, t-butyl (meth)acrylate, lauryl (meth)acrylate, myristyl (meth)acrylate, and cetyl (meth)acrylate.

These short-chain aliphatic hydrocarbon group-containing (meth)acrylates may be used alone or in combination of two or more.

Further, if necessary, the above-described monomer component may also include a cyclic hydrocarbon group-containing (meth)acrylate.

The cyclic hydrocarbon group-containing (meth)acrylate is represented by the following formula (4).

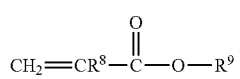

(4)

In the above-described formula (4), $R^8$ represents a hydrogen atom or a methyl group.

In the above-described formula (4), $R^9$ represents a cyclic hydrocarbon group having 4 or more and 30 or less carbon atoms (for example, an alicyclic group, an aromatic group, etc.).

Examples of the cyclic hydrocarbon group-containing (meth)acrylate include alicyclic group-containing (meth)acrylates such as cyclohexyl (meth)acrylate, t-butylcyclohexyl (meth)acrylate, isobornyl (meth)acrylate, dicyclopentanyl (meth)acrylate, dicyclopentenyl (meth)acrylate, dicyclopentanyloxyethyl (meth)acrylate, tricyclopentanyl (meth)acrylate, adamantyl (meth)acrylate, 2-methyl-2-adamantyl (meth)acrylate, and 2-ethyl-2-adamantyl (meth)acrylate; and aromatic group-containing (meth)acrylates such as benzyl (meth)acrylate.

These cyclic hydrocarbon group-containing (meth)acrylates may be used alone or in combination of two or more.

Further, if necessary, the monomer component may also include a non-fluorine copolymerizable monomer which is copolymerizable with the above-described monomer component (the long-chain aliphatic hydrocarbon group-containing (meth)acrylate, the amide group-containing monomer, the short-chain aliphatic hydrocarbon group-containing (meth)acrylate, and the cyclic hydrocarbon group-containing (meth)acrylate).

Examples of the non-fluorine copolymerizable monomer include carboxyl group-containing monomers such as (meth)acrylic acid; vinyl ester monomers such as vinyl acetate; aromatic vinyl monomers such as styrene and vinyltoluene; hydroxyl group-containing monomers such as 2-hydroxyethyl acrylate and 4-hydroxybutyl acrylate; and halogenated vinyl monomers such as vinyl chloride, vinyl bromide, and vinyl iodide (excluding those containing a fluorine atom). Preferably, a halogenated vinyl monomer (excluding those containing a fluorine atom) is used. More preferably, a vinyl chloride is used.

These non-fluorine copolymerizable monomers may be used alone or in combination of two or more.

The monomer component preferably includes a long-chain aliphatic hydrocarbon group-containing (meth)acrylate and/or an amide group-containing monomer, and more preferably includes only a long-chain aliphatic hydrocarbon group-containing (meth)acrylate.

Further, the monomer component preferably includes a long-chain aliphatic hydrocarbon group-containing (meth)acrylate and/or an amide group-containing monomer and a non-fluorine copolymerizable monomer; more preferably includes only a long-chain aliphatic hydrocarbon group-containing (meth)acrylate and a non-fluorine copolymerizable monomer, or includes a long-chain aliphatic hydrocarbon group-containing (meth)acrylate, an amide group-containing monomer, and a non-fluorine copolymerizable monomer; and even more preferably includes only a long-chain aliphatic hydrocarbon group-containing (meth)acrylate, an amide group-containing monomer, and a non-fluorine copolymerizable monomer.

Then, the non-fluorine water repellent compound is obtained by polymerizing the above-described monomer component.

Specifically, the non-fluorine water repellent compound is obtained by polymerizing the long-chain aliphatic hydrocarbon group-containing (meth)acrylate and/or the amide group-containing monomer; the short-chain aliphatic hydrocarbon group-containing (meth)acrylate which is blended if necessary; the cyclic hydrocarbon group-containing (meth)acrylate which is blended if necessary; and the non-fluorine copolymerizable monomer which is blended if necessary based on the conditions to be described later.

Thus, the non-fluorine water repellent compound is obtained.

Then, such a non-fluorine water repellent compound is a polymer including a constituent unit derived from a long-chain aliphatic hydrocarbon group-containing (meth)acrylate and/or an amide group-containing monomer.

When the non-fluorine water repellent compound is the polymer including the constituent unit derived from the long-chain aliphatic hydrocarbon group-containing (meth)acrylate and/or the amide group-containing monomer, it is possible to improve the water repellency of the water repellent treatment product to be treated by the water repellent composition.

Further, though the details are described later, the polymerization of the above-described monomer component is preferably carried out when the water repellent composition is prepared.

Further, as the non-fluorine water repellent compound, a dendrimer-based water repellent may be also used.

An example of the dendrimer-based water repellent includes a chain polymer compound having a structure which is radial and regularly branched from the center.

An example of the chain polymer compound includes ECO PLUS (manufactured by Rudolf GmbH).

The mixing ratio of the non-fluorine water repellent compound with respect to 100 parts by mass of the total amount of the polyurethane resin compound and the non-fluorine water repellent compound is, for example, 0.1 parts by mass or more, preferably 30 parts by mass or more, more preferably 50 parts by mass or more, even more preferably 70 parts by mass or more, particularly preferably 85 parts by mass or more, and for example, 99 parts by mass or less, preferably 96 parts by mass or less, more preferably 90 parts by mass or less.

The mixing ratio of the non-fluorine water repellent compound with respect to the water repellent composition is, for example, 15% by mass or more, and for example, 30% by mass or less.

When the mixing ratio of the non-fluorine water repellent compound is within the above-described range, it is possible to improve the water repellency of the water repellent treatment product to be treated by the water repellent composition.

3. Surfactant

A surfactant is blended into the water repellent composition from the viewpoint of dispersing the polyurethane resin compound and the non-fluorine water repellent compound.

Examples of the surfactant include a nonionic surfactant, an anionic surfactant, and an amphoteric surfactant.

Examples of the nonionic surfactant include polyoxyethylene alkyl ether, polyoxyethylene alkyl phenyl ether, polyoxyethylene fatty acid ester, sorbitan fatty acid ester, polyoxyethylene sorbitan fatty acid ester, polyoxyethylene sorbitol fatty acid ester, glycerin fatty acid ester, polyoxyethylene glycerin fatty acid ester, polyglycerin fatty acid ester, sucrose fatty acid ester, polyoxyethylene alkyl amine, polyoxyethylene fatty acid amide, fatty acid alkylolamide, alkyl alkanolamide, acetylene glycol, oxyethylene adduct of acetylene glycol, and polyethylene glycol polypropylene glycol blocked copolymer. Preferably, a glycerin fatty acid ester is used.

Examples of the cationic surfactant include dodecyl trimethyl ammonium acetate, trimethyl tetradecyl ammonium chloride, hexadecyl trimethyl ammonium bromide, trimethyl octadecyl ammonium chloride, (dodecylmethylbenzyl) trimethyl ammonium chloride, benzyl dodecyl dimethyl ammonium chloride, methyl dodecyl di(hydropolyoxyethylene)ammonium chloride, and benzyl dodecyl di(hydropolyoxyethylene)ammonium chloride.

Examples of the amphoteric surfactant include fatty acid betaine compounds such as alanine compound, imidazolinium betaine compound, amide betaine compound, lauryl betaine, and betaine acetate.

As the surfactant, preferably, a nonionic surfactant is used.

These surfactants may be used alone or in combination of two or more.

The mixing ratio of the surfactant with respect to 100 parts by mass of the total amount of the polyurethane resin compound and the non-fluorine water repellent compound is, for example, 10 parts by mass or more, and for example, 40 parts by mass or less.

The mixing ratio of the surfactant with respect to the water repellent composition is, for example, 0.01% by mass or more, and for example, 1% by mass or less.

4. Liquid Medium

The liquid medium includes water as an essential component.

Also, if necessary, the liquid medium further includes a solvent.

Examples of the solvent include ketones such as acetone, methyl ethyl ketone, and cyclohexanone; nitriles such as acetonitrile; alkyl esters such as methyl acetate, ethyl acetate, butyl acetate, and isobutyl acetate; aliphatic hydrocarbons such as n-hexane, n-heptane, and octane; alicyclic hydrocarbons such as cyclohexane and methyl cyclohexane; aromatic hydrocarbons such as toluene, xylene, and ethylbenzene; alcohols such as ethanol and propylene glycol; and glycol ethers such as dipropylene glycol, dipropylene glycol monomethyl ether, and tripropylene glycol. Preferably, glycol ethers are used.

The mixing ratio of the solvent with respect to the liquid medium is, for example, 5% by mass or more, preferably 15% by mass or more, and for example, 30% by mass or less.

These solvents may be used alone or in combination of two or more.

The mixing ratio of the liquid medium with respect to 100 parts by mass of the total amount of the polyurethane resin compound and the non-fluorine water repellent compound is, for example, 150 parts by mass or more, and for example, 400 parts by mass or less.

The mixing ratio of the liquid medium with respect to the water repellent composition is, for example, 50% by mass or more, and for example, 80% by mass or less.

5. Other Components

The water repellent composition includes, if necessary, at least one or more kinds selected from the group consisting of a blocked isocyanate compound, a silicone polymer, and a wax.

The blocked isocyanate compound is a compound in which an isocyanate group of an isocyanate compound is blocked by a blocking agent.

When the water repellent composition includes the blocked isocyanate compound, it is possible to improve the washing durability to be described later.

Specific examples of the blocked isocyanate compound include hydrophobic compounds described in Japanese Unexamined Patent Application No. 2017-222827, and preferably, a urethane compound having 3,5-dimethylpyrazole as a blocking agent is used.

The blocked isocyanate compound can be, for example, also used as an aqueous dispersion liquid obtained by mixing with an emulsifier (described later) to be emulsified.

In such a case, the solid content concentration of the aqueous dispersion liquid is, for example, 10% by mass or more, and for example, 40% by mass or less.

These blocked isocyanate compounds may be used alone or in combination of two or more.

The silicone polymer is a reaction product (hydrosilylation reaction product) of a silicone having an SiH group, and an aromatic compound having a vinyl group and/or an α-olefin.

When the water repellent composition includes the silicone polymer, it is possible to improve the water repellency of the water repellent treatment product to be treated by the water repellent composition.

Examples of the silicone having an SiH group include methyl hydrogen silicone (polymerization degree of 10 or more and 200 or less), and a copolymer of dimethylsiloxane and methyl hydrogen siloxane, and preferably, methyl hydrogen silicone is used.

These silicones having an SiH group may be used alone or in combination of two or more.

Examples of the aromatic compound having a vinyl group include styrene, α-methylstyrene, vinyl naphthalene, allylphenyl ether, allylnaphthyl ether, allyl-p-cumylphenyl ether, allyl-o-phenylphenyl ether, allyl-tri(phenylethyl)-phenyl ether, and allyl-tri(2-phenylpropyl)phenyl ether.

These aromatic compounds having a vinyl group may be used alone or in combination of two or more.

Examples of the α-olefin include α-olefins having 2 or more and 30 or less carbon atoms such as ethene, propene, 1-butene, 1-pentene, 1-hexene, 1-heptene, 1-octene, 1-nonene, 1-decene, 1-undecene, 1-dodecene, 1-tetradecene, 1-hexadecene, 1-octadecene, and 1-hexacosene, and preferably, ethene and 1-hexacosene are used. More preferably, from the viewpoint of improving the water repellency of the water repellent treatment product to be treated by the water repellent composition, 1-hexacosene is used.

These α-olefins may be used alone or in combination of two or more.

Then, in order to subject the silicone having an SiH group and the aromatic compound having a vinyl group and/or the α-olefin to the hydrosilylation reaction, the aromatic compound having a vinyl group and/or the α-olefin are blended into the silicone having an SiH group.

The mixing ratio of each of the silicone having an SiH group, the aromatic compound having a vinyl group, and the α-olefin is appropriately selected in accordance with the SiH group equivalent of the silicone having an SiH group, the number average molecular weight, or the like.

The aromatic compound having a vinyl group and/or the α-olefin can be collectively or dividedly blended.

In the above-described hydrosilylation reaction, if necessary, a hydrosilylation catalyst can be blended at an appropriate ratio.

Examples of the hydrosilylation catalyst include platinum and palladium, and preferably, platinum is used.

These hydrosilylation catalysts may be used alone or in combination of two or more.

In addition, in the above-described hydrosilylation reaction, if necessary, a known organic solvent can be blended at an appropriate ratio.

In the above-described hydrosilylation reaction, the reaction conditions include a reaction temperature of, for example, 50° C. or more, and for example, 90° C. or less, and the reaction time of, for example, 1 hour or more, and for example, 6 hours or less.

The above-described hydrosilylation reaction is carried out until the peak of the SiH group of the silicone having an SiH group disappears by infrared spectroscopy.

Thus, the silicone polymer is obtained.

Among the silicone polymers, preferably, a reaction product of a silicone having an SiH group and an α-olefin is used. More preferably, a reaction product of methyl hydrogensilicone and ethene (dimethylpolysiloxane), and a reaction product of methyl hydrogensilicone and 1-hexacosene are used. Even more preferably, from the viewpoint of improving the water repellency of the water repellent treatment product to be treated by the water repellent composition, a reaction product of methyl hydrogensilicone and 1-hexacosene is used.

The silicone polymer can be also used as an aqueous dispersion liquid obtained by mixing the above-described surfactant (preferably, sorbitan fatty acid ester), water, the above-described solvent, and an emulsifier (preferably, polyoxyethylene alkyl ether) (described later) to be emulsified.

In such a case, the solid content concentration of the aqueous dispersion liquid is, for example, 10% by mass or more, and for example, 40% by mass or less.

These silicone polymers may be used alone or in combination of two or more.

Examples of the wax include a natural wax and a synthetic wax.

Examples of the natural wax include petroleum waxes such as paraffin wax and microcrystalline wax, and plant waxes such as carnauba wax and candelilla wax.

An example of the synthetic wax includes a polyethylene wax.

As the wax, preferably, a natural wax is used, more preferably, a paraffin wax is used.

The wax can be also used as an aqueous dispersion liquid obtained by mixing the above-described surfactant (preferably, sorbitan fatty acid ester), water, and an emulsifier (preferably, polyoxyethylene alkyl ether) (described later) to be emulsified.

In such a case, the solid content concentration of the aqueous dispersion liquid is, for example, 10% by mass or more, and for example, 40% by mass or less.

When the water repellent composition includes the wax, it is possible to improve the water repellency of the water repellent treatment product to be treated by the water repellent composition.

These waxes may be used alone or in combination of two or more.

The mixing ratio of at least one kind selected from the group consisting of the blocked isocyanate compound, the silicone polymer, and the wax with respect to 100 parts by mass of the total amount of the polyurethane resin compound and the non-fluorine water repellent compound is, for example, 5 parts by mass or more, and for example, 20 parts by mass or less.

Further, the mixing ratio of at least one kind selected from the group consisting of the blocked isocyanate compound, the silicone polymer, and the wax with respect to the water repellent composition is 1% by mass or more, and for example, 10% by mass or less.

Then, when the water repellent composition includes the blocked isocyanate compound, the mixing ratio of the blocked isocyanate compound with respect to the total amount of the polyurethane composition, the non-fluorine water repellent compound, and the blocked isocyanate compound is, for example, 5% by mass or more, and for example, 20% by mass or less.

In addition, when the water repellent composition includes the silicone polymer, the mixing ratio of the silicone polymer with respect to the total amount of the polyurethane composition, the non-fluorine water repellent compound, and the silicone polymer is, for example, 5% by mass or more, and for example, 20% by mass or less.

In addition, when the water repellent composition includes the wax, the mixing ratio of the wax with respect to the total amount of the polyurethane composition, the non-fluorine water repellent compound, and the wax is, for example, 5% by mass or more, and for example, 20% by mass or less.

6. Method for Producing Water Repellent Composition

The water repellent composition is obtained by mixing a polyurethane resin compound, a non-fluorine water repellent compound, a surfactant, and a liquid medium.

Specifically, the water repellent composition is preferably obtained by a method for producing the non-fluorine water repellent compound by polymerizing the monomer component constituting the above-described non-fluorine water repellent compound in the presence of the polyurethane resin compound, the surfactant, and the liquid medium (hereinafter, referred to as a first method).

Examples of the polymerization method include suspension polymerization and emulsion polymerization, and preferably, from the viewpoint of obtaining an emulsion of the non-fluorine water repellent compound, emulsion polymerization is used.

When the emulsion polymerization is used, first, all or a part of the above-described monomer component (specifically, the long-chain aliphatic hydrocarbon group-containing (meth)acrylate and/or the amide group-containing monomer, the short-chain aliphatic hydrocarbon group-containing (meth)acrylate which is blended if necessary, the cyclic hydrocarbon group-containing (meth)acrylate which is blended if necessary, and the non-fluorine copolymerizable monomer which is blended if necessary), the polyurethane resin compound, the surfactant, and the liquid medium are mixed, thereby preparing a liquid mixture.

The mixing ratio of the surfactant with respect to 100 parts by mass of the total amount of the monomer component is, for example, 1 part by mass or more, preferably 3 parts by mass or more, and for example, 10 parts by mass or less, preferably 5 parts by mass or less.

The mixing ratio of the liquid medium with respect to 100 parts by mass of the total amount of the monomer component is, for example, 100 parts by mass or more, preferably 200 parts by mass or more, and for example, 400 parts by mass or less, preferably 300 parts by mass or less.

Next, the emulsifier is blended into the liquid mixture.

Examples of the emulsifier include known emulsifiers, and examples thereof include cationic emulsifiers and anionic emulsifiers.

Further, as the emulsifier, the above-described surfactant can be also used.

Also, the emulsifier preferably includes a reactive emulsifier. When the emulsifier includes the reactive emulsifier, the non-fluorine water repellent compound (polymer of the above-described monomer component) becomes a polymer including a constituent unit derived from the reactive emulsifier.

When the non-fluorine water repellent compound is the polymer including the constituent unit derived from the reactive emulsifier, the product stability of an aqueous dispersion (water repellent composition) is improved without lowering the water repellency.

The reactive emulsifier is an emulsified dispersant having radical reactivity, that is, an emulsifier having one or more polymerizable unsaturated groups in a molecule, and is an emulsifier copolymerizable with the above-described monomer component.

As the reactive emulsifier, for example, a reactive emulsifier of Japanese Unexamined Patent Application No. 2017-25440 is used, and preferably, a reactive emulsifier represented by the following formula (5) is used.

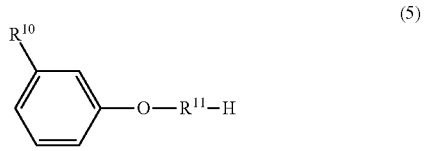

(5)

In the above-described formula (5), $R^{10}$ represents an organic residue having an ethylenically unsaturated double bond group having 12 or more and 20 or less carbon atoms.

$R^{11}$ represents an oxyalkylene group having 2 or more and 10 or less carbon atoms, and preferably represents an oxyethylene group. When the reactive emulsifier is the reactive emulsifier represented by the above-described formula (5), the product stability of the water dispersion (water repellent composition) is improved without lowering the water repellency.

As the reactive emulsifier represented by the above-described formula (5), preferably, polyoxyethylene alkylphenol is used.

These emulsifiers may be used alone or in combination of two or more.

The mixing ratio of the emulsifier with respect to 100 parts by mass of the total amount of the monomer component is, for example, 5 parts by mass or more, and for example, 18 parts by mass or less.

Further, the mixing ratio of the emulsifier with respect to 100 parts by mass of the total amount of the polyurethane resin compound and the non-fluorine water repellent compound is, for example, 8 parts by mass or more, and for example, 20 parts by mass or less.

Further, the mixing ratio of the emulsifier with respect to the water repellent composition is, for example, 0.5% by mass or more, and for example, 5% by mass or less.

Then, after mixing each of the above-described components, the liquid mixture is stirred, and an ultrasonic wave is applied to the liquid mixture, thereby emulsifying the liquid mixture.

As a method for stirring, dispersers such as a homomixer, an ultrasonic homogenizer, a pressurized homogenizer, a milder, and a porous membrane press-fit disperser are used, and preferably, a homomixer is used.

The stirring conditions are appropriately set, and when the homomixer is used, the number of rotations thereof is set to, for example, 500 rpm or more, and for example, 10000 rpm or less. The stirring time is, for example, 0.5 minutes or more, and for example, 10 minutes or less, preferably 5 minutes or less. The stirring temperature is, for example, 50° C. or more, and for example, 90° C. or less.

Then, when the above-described liquid mixture is prepared, in a case where a part of the monomer component is blended, the residue of the above-described monomer component is blended into the liquid mixture.

Then, a polymerization initiator is blended into the liquid mixture.

Examples of the polymerization initiator include azo compounds such as azobisisobutylamidine-dihydrochloride and azobisisobutyronitrile; water-soluble polymerization initiators of persulfates such as potassium persulfate and ammonium persulfate; and oil-soluble polymerization initiators of organic peroxides such as benzoyl peroxide, di-t-butyl peroxide, lauryl peroxide, cumene hydroperoxide, t-butyl peroxypivalate, and diisopropyl peroxydicarbonate. Preferably, an azo compound is used. More preferably, azobisisobutyronitrile is used.

The mixing ratio of the polymerization initiator with respect to 100 parts by mass of the monomer component is, for example, 0.01 parts by mass or more, and for example, 10 parts by mass or less.

Further, if necessary, a chain transfer agent may be blended into the liquid mixture.

Examples of the chain transfer agent include mercaptan group-containing compounds such as lauryl mercaptan, thioglycol, and thioglycerol (particularly, alkyl mercaptan (for example, having 1 or more and 30 or less carbon atoms)), and inorganic salts such as sodium hypophosphite and sodium bisulfite, and preferably, lauryl mercaptan is used.

The mixing ratio of the chain transfer agent with respect to 100 parts by mass of the monomer component is, for example, 0.01 parts by mass or more, and for example, 10 parts by mass or less.

Then, the liquid mixture is heated, thereby polymerizing the monomer component.

The heating conditions include a heating temperature of, for example, 40° C. or more, and for example, 80° C. or less, and the heating time of, for example, 1 hour or more, and for example, 6 hours or less.

Thus, an emulsion of the non-fluorine water repellent compound is obtained, and a dispersion liquid of the water repellent composition including the polyurethane resin compound, the non-fluorine water repellent compound (emulsion), the surfactant, and the liquid medium is obtained.

In the first method, the monomer component constituting the above-described non-fluorine water repellent compound is polymerized in the presence of the polyurethane resin compound, the surfactant, and the liquid medium. However, the polyurethane resin compound can be also blended after the polymerization of the monomer component in the presence of the surfactant and the liquid medium (second method).

Further, first, the monomer component is polymerized, the non-fluorine water repellent compound is prepared, and thereafter, the obtained non-fluorine water repellent compound may be also blended into the polyurethane resin compound, the surfactant, and the liquid medium (third method).

In the third method, examples of the polymerization method include solution polymerization, suspension polymerization, and emulsion polymerization.

When the solution polymerization is used, the monomer component is dissolved in an organic solvent in the presence of the above-described polymerization initiator, and after nitrogen substitution, it is heated while stirring.

The mixing ratio of the polymerization initiator with respect to 100 parts by mass of the monomer component is, for example, 0.01 parts by mass or more, and for example, 20 parts by mass or less, preferably 10 parts by mass or less.

Examples of the organic solvent include the solvents described in the above-described liquid medium.

The mixing ratio of the organic solvent with respect to 100 parts by mass of the monomer component is, for example, 10 parts by mass or more, preferably 50 parts by mass or more, and for example, 2000 parts by mass or less, preferably 1000 parts by mass or less.

The heating conditions include a heating temperature of, for example, 30° C. or more, and for example, 120° C. or less, and the heating time of, for example, 1 hour or more, and for example, 10 hours or less.

Thus, the non-fluorine water repellent compound is obtained.

Then, after the non-fluorine water repellent compound is produced by the solution polymerization, the organic solvent is removed, and the non-fluorine water repellent compound is blended into the surfactant and the liquid medium along with the polyurethane resin compound, thereby producing an emulsion of the non-fluorine water repellent compound.

Of the above-described method for producing a water repellent composition, from the viewpoint of improving the water repellency of the water repellent treatment product to be treated by the water repellent composition, preferably, a first method is used.

Then, the water repellent composition includes the polyurethane resin compound including at least one kind selected from the group consisting of the first polyurethane resin compound, the second polyurethane resin compound, and the third polyurethane resin compound, and the non-fluorine water repellent compound.

Therefore, it is possible to improve the water repellency of the water repellent treatment product to be treated by the water repellent composition.

Then, the water repellent composition can be, for example, used as a water repellent treatment liquid which is diluted with water (ion-exchanged water).

By impregnating such a water repellent treatment liquid with a fiber product, the water repellency can be imparted to the fiber product.

In other words, the fiber product is the water repellent treatment product by the above-described water repellent composition.

Examples of fibers include natural fibers such as cotton or wool, chemical fibers such as viscose rayon and lyocell, and synthetic fibers such as polyester, polyamide, acryl, and polyurethane fibers. Further, the fiber product is a product using the above-described fibers as a material, and an example thereof includes cloth (woven fabric, knitted fabric, and nonwoven fabric).

Since the fiber product is subjected to water repellent treatment by the above-described water repellent composition, it has excellent water repellency.

In the above-described description, the fiber product is subjected to water repellent treatment. However, the water repellent treatment product which is subjected to water repellent treatment by the water repellent composition is not particularly limited, and examples thereof include paper, stone materials, glass, metals, and cement.

EXAMPLES

The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS". All designations of "part" or "parts" and "%" mean part or parts by mass and % by mass, respectively, unless otherwise particularly specified.

1. Preparation of First Aliphatic Polyisocyanate Derivative

Synthetic Example 1 (Isocyanurate Derivative of Hexamethylene Diisocyanate)

In a reactor equipped with a thermometer, a stirrer, a nitrogen introducing tube, and a condenser tube, 500 parts by mass of 1,6-hexamethylene diisocyanate (HDI, manufactured by Mitsui Chemicals, Inc., trade name: TAKENATE 700), 0.25 parts by mass of 2,6-di(tert-butyl)-4-methylphenol (also known as dibutylhydroxytoluene, BHT, hindered phenol antioxidant), and 0.25 parts by mass of tetraphenyl dipropyleneglycol diphosphite (organic phosphite, co-catalyst) were mixed under a nitrogen atmosphere, thereafter, 10.7 parts by mass of 1,3-butanediol was added to the resulting liquid mixture, and nitrogen was introduced into the liquid phase for one hour. Thereafter, the liquid mixture was heated to 80° C. to be reacted for three hours, and then, the temperature thereof was lowered to 60° C. Thereafter, 0.2 parts by mass of trimethyl-N-2-hydroxypropylammonium 2-ethylhexanoate, as an isocyanurate catalyst, was added thereto to be reacted for 1.5 hours. Thereafter, 0.04 parts by mass of o-toluenesulfonamide was added to 100 parts by mass of HDI. Thereafter, the reaction liquid mixture was passed through a thin-film distillation device (temperature of 150° C., vacuum degree of 93.3 Pa), and distilled until the residual HDI monomer amount was 0.5% or less, thereby obtaining a first aliphatic polyisocyanate derivative (isocyanurate derivative of hexamethylene diisocyanate). The obtained first aliphatic polyisocyanate derivative had an isocyanate group content of 20.9%, and an average number of isocyanate functional groups of 3.0.

2. Preparation of Polyurethane Resin Compound

Production Example 1 (First Polyurethane Resin Compound)

In a reactor equipped with a stirrer, a thermometer, a condenser tube, and a nitrogen gas introducing tube, 100.20 g of first aliphatic polyisocyanate derivative of Synthetic Example 1, as a first aliphatic polyisocyanate derivative, 67.60 g of KALCOL 8098 (stearyl alcohol, manufactured by Kao Corporation), as a first long-chain active hydrogen compound, and 22.30 g of olefin alcohol were mixed, and reacted at 110° C. for four hours under a nitrogen atmosphere until the isocyanate group concentration was 3.67%.

Then, the reaction liquid was cooled to 80° C., and 9.90 g of N-methyldiethanolamine, as a cationic active hydrogen compound, was added thereto to be reacted at 80° C. for one hour.

Then, 50.00 g of methyl ethyl ketone, as a solvent, was added, and the mixture was reacted at 80° C. until it was confirmed that the isocyanate group disappeared by infrared absorption spectrum.

Then, 57.69 g of methyl ethyl ketone was added to the reaction liquid, the temperature of the resulting liquid was increased to 80° C., and it was mixed until the reaction liquid was completely dissolved to be then cooled to 75° C.

Thereafter, 18.96 g of acetic acid, as an acid compound, was added to be neutralized.

Then, 800.0 g of ion-exchanged water heated at 70° C. was gradually added to be emulsified (internally emulsified), while the reaction liquid was kept at 75° C.

Then, the resulting reaction liquid was desolvated with an evaporator at a water bath temperature of 60° C. under a reduced pressure until the solid content concentration thereof was 20% by mass or more.

Then, an aqueous dispersion liquid including the first polyurethane resin compound was obtained by adjusting with ion-exchanged water so that the solid content concentration excluding the acid compound (acetic acid) was 20% by mass.

Production Example 2 (Second Polyurethane Resin Compound)

A 500-mL four-necked flask equipped with a stirring bar, a thermometer, and a reflux tube was charged with 116 g of sorbitan tristearate and 150 g of 4-methyl-2-pentanone (MIBK). Then, in order to remove excess water vapor of the liquid mixture, the liquid mixture was stirred, while the temperature thereof was kept at 70° C., and the liquid mixture was refluxed for one hour, and then allowed to cool to 50° C. Then, while stirring, 30 g of Desmodur N-100 (biuret derivative of hexamethylene diisocyanate, manufactured by Covestro AG) was added dropwise to the liquid mixture by a dropping funnel. After completion of the dropwise addition, one drop of dibutyltin dilaurate, as a catalyst, was added, and the mixture was reacted at 80° C. for one hour. Then, 25 g of sorbitan monostearate was added thereto, and further reacted at 80° C. for four hours.

Then, after cooling to 60° C., the reaction liquid was collected, and the reaction liquid, and water at 60° C. including an arbitrary amount of a cationic emulsifier and a polyoxyethylene alkyl ether were slowly mixed. The mixture was emulsified and dispersed with ultrasonic waves for 15 minutes after stirring at 6000 rpm for one minute using a homomixer. Thereafter, after removing the solvent (MIBK) by a reduced pressure operation, pure water was added to adjust the concentration, thereby obtaining an aqueous dispersion liquid containing a second polyurethane resin compound having the solid content concentration of 20%.

Production Example 3 (Third Polyurethane Resin Compound)

A 500-mL four-necked flask equipped with a stirring bar, a thermometer, and a reflux tube was charged with 150 g of methyl ethyl ketone (MEK) and 51 g of stearyl alcohol.

Then, in order to remove excess water vapor of the liquid mixture, the liquid mixture was stirred, while the temperature thereof was kept at 70° C., and the liquid mixture was refluxed for one hour, and then allowed to cool to 50° C. Then, 30 g of Desmodur N3200A (biuret derivative of hexamethylene diisocyanate, manufactured by Covestro AG) was added to the liquid mixture, and further reacted at 80° C. for four hours.

Then, after cooling to 60° C., the reaction liquid was collected, and the reaction liquid, and water at 60° C. including an arbitrary amount of a polyoxyethylene alkyl ether were slowly mixed. The mixture was emulsified and dispersed with ultrasonic waves for 15 minutes after stirring at 6000 rpm for one minute using a homomixer.

Thereafter, after removing the solvent (MEK) by a reduced pressure operation, pure water was added to adjust the concentration, thereby obtaining an aqueous dispersion liquid containing a third polyurethane resin compound having the solid content concentration of 20%.

3. Preparation of Dispersion Liquid Containing Non-Fluorine Water Repellent Compound, Surfactant, and Liquid Medium Production Example 4

A 500-ml plastic container was charged with 30 g of water-soluble glycol-based solvent and 120 g of pure water, as a liquid medium; 40 g of stearyl acrylate, as a long-chain aliphatic hydrocarbon group-containing (meth)acrylate; 2 g of sorbitan fatty acid ester, as a surfactant; and 2 g of cationic emulsifier and 6 g of polyoxyethylene alkyl ether, as an emulsifier, and heated to 80° C. The mixture was emulsified and dispersed with ultrasonic waves for 15 minutes after stirring at 2000 rpm for one minute using a homomixer.

Next, the mixture was transferred to a 500-ml autoclave and after nitrogen substitution, 0.2 g of lauryl mercaptan, as a chain transfer agent, and 20 g of vinyl chloride, as a non-fluorine copolymerizable monomer, were charged. Further, 1 g of azo group-containing water-soluble initiator, as a polymerization initiator, was added, the temperature thereof was increased to 60° C., and the mixture was reacted for 4 hours, thereby obtaining an aqueous dispersion liquid of a polymer (non-fluorine water repellent compound). The dispersion liquid was further diluted with pure water, thereby preparing an aqueous dispersion liquid of the non-fluorine water repellent compound having the solid content concentration of 30% (specifically, a dispersion liquid containing a non-fluorine water repellent compound, a surfactant, and a liquid medium).

Production Examples 5 to 7

A dispersion liquid containing a non-fluorine water repellent compound, a surfactant, and a liquid medium was prepared in the same manner as in Production Example 4, except that the mixing formulation was changed in accordance with Table 1.

4. Preparation of Silicone Polymer

Production Example 8

A 200-mL four-necked flask equipped with a stirring bar, a thermometer, and a reflux tube was charged with 12 g of methyl hydrogensilicone oil (mole ratio of $SiH:SiCH_3=50:50$, measured by 1H NMR) and 0.02 g of platinum catalyst. Next, 36 g of 1-hexacosene was charged into the dropping funnel, and 1-hexacosene was added dropwise from the dropping funnel, while the temperature thereof was kept at 70° C. After completion of the dropwise addition, the mixture was further reacted at 70° C. for 3 hours. It was confirmed that the peak of SiH disappeared by infrared spectroscopy (IR), thereby obtaining 47 g of solid silicone polymer.

Next, a 250-ml glass container was charged with 28 g of silicone polymer, 5.6 g of water-soluble glycol-based solvent, 60 g of pure water, 1.7 g of sorbitan fatty acid ester, 0.7 g of polyoxyethylene alkyl ether, and 0.6 g of cationic emulsifier. The mixture was heated to 75° C., stirred at 2000 rpm for one minute with a homomixer, and then, emulsified and dispersed with ultrasonic waves for 10 minutes, thereby obtaining an aqueous dispersion liquid of the silicone polymer. Thereafter, pure water was added thereto, thereby preparing an aqueous dispersion liquid of the silicone polymer having the solid content concentration of 30% by mass.

5. Preparation of Wax

Production Example 9

An aqueous dispersion liquid of a wax was prepared by putting 150 g of paraffin wax (melting point of 75° C.), 350 g of pure water, 4.5 g of polyoxyethylene alkyl ether, and 3 g of sorbitan fatty acid ester into a pressure reaction vessel to be sealed, increasing the temperature thereof to 110 to 120° C., while stirring, and then, subjecting the mixture to high-pressure emulsification for 30 minutes under a high pressure. Thereafter, pure water was added thereto, thereby preparing an aqueous dispersion liquid of the wax having the solid content of 30%.

6. Water Repellent Composition

<Production of Water Repellent Composition by Second Method>

Example 1

A water repellent composition was prepared by mixing 2.5 g of polyurethane composition (solid content concentration of 20% by mass) of Production Example 1, and 31.7 g of dispersion liquid (solid content concentration of 30% by mass) containing the non-fluorine water repellent compound, the surfactant, and the liquid medium of Production Example 4.

Examples 2 to 30 and Examples 35 and 36

A water repellent composition was prepared in the same manner as in Example 1, except that the mixing formulation was changed in accordance with Tables 2 to 5.

In Tables 2 to 5, the mixing ratio (% by mass) of an effective amount of each component (the polyurethane composition, the non-fluorine water repellent compound, the silicone polymer, the wax, and the blocked isocyanate compound) with respect to the total amount of the polyurethane composition, the non-fluorine water repellent compound, the silicone polymer, the wax, and the blocked isocyanate compound is shown.

In addition, in Tables 2 to 5, the stearyl group-containing amide acrylate is a stearic acid amide ethyl acrylate.

In Tables 2 to 5, the polyoxyethylene alkylphenol is LATEMUL PD-420 manufactured by Kao Corporation.

In addition, in Tables 2 to 5, the dendrimer-based water repellent is specifically ECO PLUS (manufactured by Rudolf GmbH).

In addition, in Tables 2 to 5, the blocked isocyanate composition is specifically a urethane compound having 3,5-dimethylpyrazole as a blocking agent.

<Production of Water Repellent Composition by First Method>

Example 31

A 500-ml plastic container was charged with 25.5 g of water-soluble glycol-based solvent and 113 g of pure water, as a liquid medium; 34 g of stearyl acrylate, as a long-chain aliphatic hydrocarbon group-containing (meth)acrylate; 1.7 g of sorbitan fatty acid ester, as a surfactant; 1.7 g of cationic emulsifier and 5.1 g of polyoxyethylene alkyl ether, as an emulsifier; 11 g of silicone polymer of Production Example 8, as a silicone polymer; and 28 g of aqueous dispersion liquid of first polyurethane composition (solid content concentration of 20% by mass) of Production Example 1, as a polyurethane composition, and heated to 80° C. The mixture was emulsified and dispersed with ultrasonic waves for 15 minutes after stirring at 2000 rpm for one minute using a homomixer. Next, the dispersion liquid was transferred to a 500-ml autoclave and after nitrogen substitution, 0.17 g of lauryl mercaptan, as a chain transfer agent, and 17 g of vinyl chloride, as a non-fluorine copolymerizable monomer, were charged. Further, 0.85 g of azo group-containing water-soluble initiator, as a polymerization initiator, was added, the temperature thereof was increased to 60° C., and the mixture was reacted for 4 hours, thereby obtaining an aqueous dispersion liquid of the water repellent composition. Next, pure water was added thereto, thereby preparing an aqueous dispersion liquid of the water repellent composition having the solid content of 30%.

In Table 4, the mixing ratio (% by mass) of the effective amount of each component (the polyurethane composition, the non-fluorine water repellent compound, and the silicone polymer) of Example 31 with respect to the polyurethane composition, the non-fluorine water repellent compound, and the silicone polymer is shown.

Examples 32 to 34

A water repellent composition was prepared in the same manner as in Example 31, except that the mixing formulation was changed in accordance with Table 6.

In Table 4, the mixing ratio (% by mass) of the effective amount of each component (the polyurethane composition, the non-fluorine water repellent compound, and the silicone polymer) of Examples 32 to 34 with respect to the polyurethane composition, the non-fluorine water repellent compound, and the silicone polymer is shown.

Comparative Examples

Comparative Examples 1 to 17

A water repellent composition was prepared in the same manner as in Example 1, except that the mixing formulation was changed in accordance with Tables 4 and 5.
7. Evaluation
(Average Number of Isocyanate Functional Groups)

An average number of isocyanate functional groups of each of the aliphatic polyisocyanate derivatives of Synthetic Examples was calculated from the isocyanate group concentration A of the aliphatic polyisocyanate derivative, the solid content concentration B, and the number average molecular weight C of gel permeation chromatography measured by the following device and conditions by the following formula (6).

$$\text{Average Number of Isocyanate Functional Groups} = A/B \times C/42.02 \quad (6)$$

(In formula, A represents the isocyanate group concentration of the aliphatic polyisocyanate derivative, B represents the solid content concentration, and C represents a number average molecular weight.)

(Measurement Conditions of Number Average Molecular Weight)
  Device: HLC-8220GPC (manufactured by TOSOH CORPORATION)
  Column: TSKgelG1000HXL, TSKgelG2000HXL, and TSKgelG3000HXL (manufactured by TOSOH CORPORATION) were connected in series
  Detector: differential refractometer
  Injection volume: 100 μL
  Eluent: tetrahydrofuran
  Flow rate: 0.8 mL/min
  Temperature: 40° C.
  Calibration curve: standard polyethylene oxide in a range of 106 to 22450 (manufactured by TOSOH CORPORATION, trade name: TSK standard polyethylene oxide)
(Water Repellency Evaluation)
<Preparation of Test Cloth>

Each of the water repellent compositions of Examples and Comparative Examples was diluted with tap water, thereby preparing 1000 g of test liquid having the solid content concentration of 1.0% by mass.

Next, after impregnating a test liquid 1 with a test cloth (urethane/polyester mixed cloth, urethane/nylon mixed cloth, polyester cloth, and nylon cloth), the test cloth was passed through a mangle, and passed through a pin tenter at 160° C. for one minute to be dried and cured.
<Water Repellency Evaluation by Spraying Method>

The water repellency of the treatment cloth of each of the above-described test cloths was evaluated in conformity with the spraying method of JIS-L-1092 (AATCC-22).

The water repellency was evaluated based on the criteria shown below. The larger the point number, the more excellent the water repellency. The results are shown in Tables 2 to 5.
  100: No wetting or adhesion of water droplet was observed on the surface.
  90: No wetting on the surface, but adhesion of small water droplets was observed.
  80: Wetting on small individual water droplets was observed on the surface.
  70: A state was observed in which wetting was exhibited in a half of the surface, and small individual wetting was impregnated in the cloth.
  50: Wetting was observed in the entire surface.
  0: Wetting was observed in the entire front surface and rear surface.
<Bundesmann Test>

For each of the above-described test cloths, an amount of water leakage (mL) was measured by rainfall under the conditions of 80 cc/mm of amount of rainfall, 20° C. of rainfall temperature, and one minute of rainfall time in accordance with the Bundesmann test described in the JRS-L-1092 (C) method. The amount of water leakage represents the amount of water (ml) passing through the cloth surface during the Bundesmann test. The results are shown in Tables 2 to 5.
<Washing Durability>

For each of the above-described test cloths, the water repellency of the test cloth dried with a tumbler (at 60° C. for 30 minutes) after washing 20 times in conformity with JIS L-0217 103 was evaluated. The results are shown in Tables 2 to 5.

TABLE 1

|  |  |  | Production Ex. 4 | Production Ex. 5 | Production Ex. 6 | Production Ex. 7 |
|---|---|---|---|---|---|---|
| Non-Fluorine Water Repellent Compound | Long-Chain Aliphatic Hydrocarbon Group-Containing (Meth)Acrylate | Steary Acrylate | 40 | 60 | 20 | 40 |
|  | Amide Group-Containing Monomer | Stearyl Group-Containing Amide Acrylate | — | — | 20 | — |
|  | Non-Fluorine Copolymerizable Monomer | Vinyl Chloride | 20 | — | 20 | 20 |
| Surfactant | Sorbitan Fatty Acid Ester |  | 2 | 2 | 2 | 2 |
| Liquid Solution | Pure Water |  | 120 | 120 | 120 | 120 |
|  | Water-Soluble Glycol-Based Solvent |  | 30 | 30 | 30 | 30 |
| Emulsifier | Cationic Emulsifier |  | 2 | 2 | 2 | 2 |
|  | Polyoxyethylene Alkyl Ether |  | 6 | 6 | 6 | — |
|  | Reactive Emulsifier | Polyoxyethylene Alkylphenol | — | — | — | 6 |
| Polymerization Initiator | Azo Group-Containing Water-Soluble Initiator |  | 1 | 1 | 1 | 1 |
| Chain Transfer Agent | Lauryl Mercaptan |  | 0.2 | 0.2 | 0.2 | 0.2 |

TABLE 2

|  |  |  | Ex. 1 | Ex. 2 | Ex. 3 | Ex. 4 | Ex. 5 | Ex. 6 | Ex. 7 | Ex. 8 |
|---|---|---|---|---|---|---|---|---|---|---|
| Water Repellent Composition | Polyurethane Resin Composition | Production Ex. 1 (First Polyurethane Resin Composition) | 5 | 5 | 5 | 5 | 5 | — | — | — |
|  |  | Production Ex. 2 (Second Polyurethane Resin Composition) | — | — | — | — | — | 5 | 5 | 5 |
|  |  | Production Ex. 3 (Third Polyurethane Resin Composition) | — | — | — | — | — | — | — | — |
|  | Non-Fluorine Water Repellent Compound | Production Ex. 4 | 95 | — | — | — | — | 95 | — | — |
|  |  | Production Ex. 5 | — | 95 | — | — | — | — | 95 | — |
|  |  | Production Ex. 6 | — | — | 95 | — | — | — | — | 95 |
|  |  | Production Ex. 7 | — | — | — | 95 | — | — | — | — |
|  |  | Dendrimer Aqueous Dispersion Liquid | — | — | — | — | 95 | — | — | — |
|  | Silicone Polymer | Dimethylpolysiloxane Aqueous Dispersion Liquid | — | — | — | — | — | — | — | — |
|  |  | Silicone Polymer of Production Ex. 8 | — | — | — | — | — | — | — | — |
|  | Wax | Wax of Production Ex. 9 | — | — | — | — | — | — | — | — |
|  | Blocked Isocyanate Compound |  | — | — | — | — | — | — | — | — |
| Evaluation | Water Repellency | Water Repellency Evaluation by Spraying Method | Urethane/Polyester Mixed Cloth | 90 | 90 | 90 | 90 | 90 | 80 | 80 | 80 |
|  |  |  | Urethane/Nylon Mixed Cloth | 90 | 90 | 90 | 90 | 90 | 80 | 80 | 80 |
|  |  |  | Polyester Cloth | 90 | 80 | 100 | 80 | 80 | 90 | 80 | 100 |
|  |  |  | Nylon Cloth | 90 | 80 | 100 | 80 | 80 | 90 | 80 | 100 |
|  |  | Amount of Water Leakage (ml) | Urethane/Polyester Mixed Cloth | 14 | 16 | 10 | 14 | 16 | 13 | 16 | 11 |
|  |  |  | Urethane/Nylon Mixed Cloth | 10 | 12 | 10 | 11 | 12 | 10 | 11 | 10 |
|  |  | Washing Durability | Polyester Cloth Before Washing | 90 | — | 100 | — | — | — | — | — |
|  |  |  | Polyester Cloth After Washing 20 times | 80 | — | 80 | — | — | — | — | — |
|  |  |  | Nylon Cloth Before Washing | 90 | — | 100 | — | — | — | — | — |
|  |  |  | Nylon Cloth After Washing 20 times | 80 | — | 80 | — | — | — | — | — |

TABLE 2-continued

|  |  |  | Ex.• Comparative Ex. No. |  |  |  |  |  |  |
|---|---|---|---|---|---|---|---|---|---|
|  |  |  | Ex. 9 | Ex. 10 | Ex. 11 | Ex. 12 | Ex. 13 | Ex. 14 | Ex. 15 |
| Water Repellent Composition | Polyurethane Resin Composition | Production Ex. 1 (First Polyurethane Resin Composition) | — | — | — | — | — | — | — |
|  |  | Production Ex. 2 (Second Polyurethane Resin Composition) | 5 | 5 | — | — | — | — | — |
|  |  | Production Ex. 3 (Third Polyurethane Resin Composition) | — | — | 5 | 5 | 5 | 5 | 5 |
|  | Non-Fluorine Water Repellent Compound | Production Ex. 4 | — | — | 95 | — | — | — | — |
|  |  | Production Ex. 5 | — | — | — | 95 | — | — | — |
|  |  | Production Ex. 6 | — | — | — | — | 95 | — | — |
|  |  | Production Ex. 7 | 95 | — | — | — | — | 95 | — |
|  |  | Dendrimer Aqueous Dispersion Liquid | — | 95 | — | — | — | — | 95 |
|  | Silicone Polymer | Dimethylpolysiloxane Aqueous Dispersion Liquid | — | — | — | — | — | — | — |
|  |  | Silicone Polymer of Production Ex. 8 | — | — | — | — | — | — | — |
|  | Wax | Wax of Production Ex. 9 | — | — | — | — | — | — | — |
|  | Blocked Isocyanate Compound |  | — | — | — | — | — | — | — |
| Evaluation | Water Repellency | Water Repellency Evaluation by Spraying Method | Urethane/Polyester Mixed Cloth | 80 | 80 | 80 | 80 | 80 | 80 | 80 |
|  |  |  | Urethane/Nylon Mixed Cloth | 80 | 80 | 80 | 80 | 80 | 80 | 80 |
|  |  |  | Polyester Cloth | 80 | 80 | 80 | 80 | 80 | 80 | 80 |
|  |  |  | Nylon Cloth | 80 | 80 | 80 | 80 | 80 | 80 | 80 |
|  |  | Amount of Water Leakage (ml) | Urethane/Polyester Mixed Cloth | 14 | 15 | 22 | 20 | 14 | 18 | 19 |
|  |  |  | Urethane/Nylon Mixed Cloth | 11 | 11 | 14 | 16 | 14 | 15 | 15 |
|  | Washing Durability | Polyester Cloth | Before Washing | — | — | — | — | — | — | — |
|  |  |  | After Washing 20 times | — | — | — | — | — | — | — |
|  |  | Nylon Cloth | Before Washing | — | — | — | — | — | — | — |
|  |  |  | After Washing 20 times | — | — | — | — | — | — | — |

TABLE 3

|  |  |  | Ex.• Comparative Ex. No. |  |  |  |  |  |  |  |
|---|---|---|---|---|---|---|---|---|---|---|
|  |  |  | Ex. 16 | Ex. 17 | Ex. 18 | Ex. 19 | Ex. 20 | Ex. 21 | Ex. 22 | Ex. 23 |
| Water Repellent Composition | Polyurethane Resin Composition | Production Ex. 1 (First Polyurethane Resin Composition) | 5 | 5 | 5 | 5 | 5 | 5 | 5 | 5 |
|  |  | Production Ex. 2 (Second Polyurethane Resin Composition) | — | — | — | — | — | — | — | — |
|  |  | Production Ex. 3 (Third Polyurethane Resin Composition) | — | — | — | — | — | — | — | — |
|  | Non-Fluorine Water Repellent Compound | Production Ex. 4 | 85 | — | — | — | — | 85 | — | — |
|  |  | Production Ex. 5 | — | 85 | — | — | — | — | 85 | — |
|  |  | Production Ex. 6 | — | — | 85 | — | — | — | — | 85 |
|  |  | Production Ex. 7 | — | — | — | 85 | — | — | — | — |
|  |  | Dendrimer Aqueous Dispersion Liquid | — | — | — | — | 85 | — | — | — |
|  | Silicone Polymer | Dimethylpolysiloxane Aqueous Dispersion Liquid | 10 | 10 | 10 | 10 | 10 | — | — | — |
|  |  | Silicone Polymer of Production Ex. 8 | — | — | — | — | — | 10 | 10 | 10 |
|  | Wax | Wax of Production Ex. 9 | — | — | — | — | — | — | — | — |
|  | Blocked Isocyanate Compound |  | — | — | — | — | — | — | — | — |
| Evaluation | Water Repellency | Water Repellency Evaluation by Spraying Method | Urethane/Polyester Mixed Cloth | 90 | 90 | 90 | 90 | 90 | 90 | 90 | 90 |
|  |  |  | Urethane/Nylon Mixed Cloth | 90 | 90 | 90 | 90 | 90 | 90 | 90 | 100 |
|  |  |  | Polyester Cloth | 90 | 80 | 100 | 80 | 80 | 90 | 90 | 100 |
|  |  |  | Nylon Cloth | 90 | 80 | 100 | 80 | 80 | 100 | 90 | 100 |

TABLE 3-continued

| | | | Ex. 17 | Ex. 18 | Ex. 19 | Ex. 20 | Ex. 21 | Ex. 22 | Ex. 23 | |
|---|---|---|---|---|---|---|---|---|---|---|
| Amount of Water Leakage (ml) | Urethane/Polyester Mixed Cloth | | 13 | 14 | 10 | 13 | 15 | 10 | 11 | 7 |
| | Urethane/Nylon Mixed Cloth | | 10 | 12 | 10 | 11 | 12 | 7 | 9 | 7 |
| Washing Durability | Polyester Cloth | Before Washing | — | — | — | — | — | — | — | — |
| | | After Washing 20 times | — | — | — | — | — | — | — | — |
| | Nylon Cloth | Before Washing | — | — | — | — | — | — | — | — |
| | | After Washing 20 times | — | — | — | — | — | — | — | — |

| | | | Ex.• Comparative Ex. No. | | | | | | |
|---|---|---|---|---|---|---|---|---|---|
| | | | Ex. 24 | Ex. 25 | Ex. 26 | Ex. 27 | Ex. 28 | Ex. 29 | Ex. 30 |
| Water Repellent Composition | Polyurethane Resin Composition | Production Ex. 1 (First Polyurethane Resin Composition) | 5 | 5 | 5 | 5 | 5 | 5 | 5 |
| | | Production Ex. 2 (Second Polyurethane Resin Composition) | — | — | — | — | — | — | — |
| | | Production Ex. 3 (Third Polyurethane Resin Composition) | — | — | — | — | — | — | — |
| | Non-Fluorine Water Repellent Compound | Production Ex. 4 | — | — | 85 | — | — | — | — |
| | | Production Ex. 5 | — | — | — | 85 | — | — | — |
| | | Production Ex. 6 | — | — | — | — | 85 | — | — |
| | | Production Ex. 7 | 85 | — | — | — | — | 85 | — |
| | | Dendrimer Aqueous Dispersion Liquid | — | 85 | — | — | — | — | 85 |
| | Silicone Polymer | Dimethylpolysiloxane Aqueous Dispersion Liquid | — | — | — | — | — | — | — |
| | | Silicone Polymer of Production Ex. 8 | 10 | 10 | — | — | — | — | — |
| | Wax | Wax of Production Ex. 9 | — | — | 10 | 10 | 10 | 10 | 10 |
| | Blocked Isocyanate Compound | | — | — | — | — | — | — | — |
| Evaluation | Water Repellency | Water Repellency Evaluation by Spraying Method | Urethane/Polyester Mixed Cloth | 90 | 90 | 90 | 90 | 90 | 90 | 90 |
| | | | Urethane/Nylon Mixed Cloth | 90 | 90 | 90 | 90 | 90 | 90 | 90 |
| | | | Polyester Cloth | 90 | 90 | 90 | 80 | 100 | 80 | 80 |
| | | | Nylon Cloth | 90 | 90 | 90 | 80 | 100 | 80 | 80 |
| | | Amount of Water Leakage (ml) | Urethane/Polyester Mixed Cloth | 11 | 14 | 10 | 12 | 7 | 10 | 14 |
| | | | Urethane/Nylon Mixed Cloth | 9 | 10 | 8 | 9 | 8 | 10 | 9 |
| | | Washing Durability | Polyester Cloth | Before Washing | — | — | — | — | — | — | — |
| | | | | After Washing 20 times | — | — | — | — | — | — | — |
| | | | Nylon Cloth | Before Washing | — | — | — | — | — | — | — |
| | | | | After Washing 20 times | — | — | — | — | — | — | — |

TABLE 4

| | | | Ex.• Comparative Ex. No. | | | | | | | |
|---|---|---|---|---|---|---|---|---|---|---|
| | | | Ex. 31 | Ex. 32 | Ex. 33 | Ex. 34 | Ex. 35 | Ex. 36 | Comparative Ex. 1 | Comparative Ex. 2 |
| Water Repellent Composition | Polyurethane Resin Composition | Production Ex. 1 (First Polyurethane Resin Composition) | 5 | 5 | 5 | 5 | 5 | 5 | 100 | — |
| | | Production Ex. 2 (Second Polyurethane Resin Composition) | — | — | — | — | — | — | — | 100 |
| | | Production Ex. 3 (Third Polyurethane Resin Composition) | — | — | — | — | — | — | — | — |
| | Non-Fluorine Water Repellent Compound | Production Ex. 4 | 85* | 85* | 85* | 85* | 85 | — | — | — |
| | | Production Ex. 5 | — | — | — | — | — | — | — | — |
| | | Production Ex. 6 | — | — | — | — | — | 85 | — | — |
| | | Production Ex. 7 | | | | | | | | |

TABLE 4-continued

| | | | | | | | | | | | |
|---|---|---|---|---|---|---|---|---|---|---|---|
| | | | Dendrimer Aqueous Dispersion Liquid | — | — | — | — | — | — | — | — |
| | | Silicone Polymer | Dimethylpolysiloxane Aqueous Dispersion Liquid | — | — | — | — | — | — | — | — |
| | | | Silicone Polymer of Production Ex. 8 | 10 | 10 | 10 | 10 | — | — | — | — |
| | Wax | | Wax of Production Ex. 9 | — | — | — | — | — | — | — | — |
| | Blocked Isocyanate Compound | | | — | — | — | — | 10 | 10 | — | — |
| Evaluation | Water Repellency | Water Repellency Evaluation by Spraying Method | Urethane/ Polyester Mixed Cloth | 90 | 90 | 100 | 90 | — | — | 70 | 70 |
| | | | Urethane/ Nylon Mixed Cloth | 100 | 90 | 100 | 90 | — | — | 70 | 70 |
| | | | Polyester Cloth | 90 | 90 | 100 | 90 | — | — | 80 | 80 |
| | | | Nylon Cloth | 100 | 100 | 100 | 100 | — | — | 80 | 80 |
| | | Amount of Water Leakage (ml) | Urethane/ Polyester Mixed Cloth | 8 | 10 | 4 | 9 | — | — | 20 | 22 |
| | | | Urethane/ Nylon Mixed Cloth | 6 | 8 | 3 | 7 | — | — | 21 | 24 |
| | | Washing Durability | Polyester Cloth Before Washing | — | — | — | — | 90 | 100 | — | — |
| | | | Polyester Cloth After Washing 20 times | — | — | — | — | 90 | 100 | — | — |
| | | | Nylon Cloth Before Washing | — | — | — | — | 90 | 100 | — | — |
| | | | Nylon Cloth After Washing 20 times | — | — | — | — | 90 | 100 | — | — |

| | | | | Ex.• Comparative Ex. No. | | | | | |
|---|---|---|---|---|---|---|---|---|---|
| | | | | Comparative Ex. 3 | Comparative Ex. 4 | Comparative Ex. 5 | Comparative Ex. 6 | Comparative Ex. 7 | Comparative Ex. 8 |
| Water Repellent Composition | Polyurethane Resin Composition | | Production Ex. 1 (First Polyurethane Resin Composition) | — | — | — | — | — | — |
| | | | Production Ex. 2 (Second Polyurethane Resin Composition) | — | — | — | — | — | — |
| | | | Production Ex. 3 (Third Polyurethane Resin Composition) | 100 | — | — | — | — | — |
| | Non-Fluorine Water Repellent Compound | | Production Ex. 4 | — | 100 | — | — | — | — |
| | | | Production Ex. 5 | — | — | 100 | — | — | — |
| | | | Production Ex. 6 | — | — | — | 100 | — | — |
| | | | Production Ex. 7 | — | — | — | — | 100 | — |
| | | | Dendrimer Aqueous Dispersion Liquid | — | — | — | — | — | 100 |
| | Silicone Polymer | | Dimethylpolysiloxane Aqueous Dispersion Liquid | — | — | — | — | — | — |
| | | | Silicone Polymer of Production Ex. 8 | — | — | — | — | — | — |
| | Wax | | Wax of Production Ex. 9 | — | — | — | — | — | — |
| | Blocked Isocyanate Compound | | | — | — | — | — | — | — |
| Evaluation | Water Repellency | Water Repellency Evaluation by Spraying Method | Urethane/ Polyester Mixed Cloth | 70 | 70 | 70 | 70 | 70 | 70 |
| | | | Urethane/ Nylon Mixed Cloth | 70 | 70 | 70 | 70 | 70 | 70 |
| | | | Polyester Cloth | 70 | 90 | 80 | 100 | 80 | 80 |
| | | | Nylon Cloth | 70 | 90 | 80 | 100 | 80 | 80 |
| | | Amount of Water Leakage (ml) | Urethane/ Polyester Mixed Cloth | 31 | 16 | 20 | 14 | 17 | 18 |
| | | | Urethane/ Nylon Mixed Cloth | 33 | 18 | 21 | 15 | 17 | 16 |
| | | Washing Durability | Polyester Cloth Before Washing | — | — | — | — | — | — |
| | | | Polyester Cloth After Washing 20 times | — | — | — | — | — | — |
| | | | Nylon Cloth Before Washing | — | — | — | — | — | — |
| | | | Nylon Cloth After Washing 20 times | — | — | — | — | — | — |

*represents non-fluorine water repellent compound in water repellent composition

TABLE 5

| | | | Ex.• Comparative Ex. No. | | | | |
|---|---|---|---|---|---|---|---|
| | | | Comparative Ex. 9 | Comparative Ex. 10 | Comparative Ex. 11 | Comparative Ex. 12 | Comparative Ex. 13 |
| Water Repellent Composition | Polyurethane Resin Composition | Production Ex. 1 (First Polyurethane Resin Composition) | — | — | — | — | — |
| | | Production Ex. 2 (Second Polyurethane Resin Composition) | — | — | — | — | — |
| | | Production Ex. 3 (Third Polyurethane Resin Composition) | — | — | — | — | — |
| | Non-Fluorine Water Repellent Compound | Production Ex. 4 | 89 | — | — | — | — |
| | | Production Ex. 5 | — | 89 | — | — | — |
| | | Production Ex. 6 | — | — | 89 | — | — |
| | | Production Ex. 7 | — | — | — | 89 | — |
| | | Dendrimer Aqueous Dispersion Liquid | — | — | — | — | 89 |
| | Silicone Polymer | Dimethylpolysiloxane Aqueous Dispersion Liquid | — | — | — | — | — |
| | | Silicone Polymer of Production Ex. 8 | 11 | 11 | 11 | 11 | 11 |
| | Wax | Wax of Production Ex. 9 | — | — | — | — | — |
| | Blocked Isocyanate Compound | | — | — | — | — | — |
| Evaluation | Water Repellency | Water Repellency Evaluation by Spraying Method | Urethane/Polyester Mixed Cloth | 70 | 70 | 80 | 70 | 70 |
| | | | Urethane/Nylon Mixed Cloth | 70 | 70 | 80 | 70 | 70 |
| | | | Polyester Cloth | 90 | 80 | 100 | 80 | 80 |
| | | | Nylon Cloth | 90 | 80 | 100 | 80 | 80 |
| | | Amount of Water Leakage (ml) | Urethane/Polyester Mixed Cloth | 14 | 17 | 11 | 14 | 14 |
| | | | Urethane/Nylon Mixed Cloth | 15 | 18 | 12 | 14 | 13 |
| | | Washing Durability | Polyester Cloth Before Washing | — | — | — | — | — |
| | | | Polyester Cloth After Washing 20 times | — | — | — | — | — |
| | | | Nylon Cloth Before Washing | — | — | — | — | — |
| | | | Nylon Cloth After Washing 20 times | — | — | — | — | — |

| | | | Ex.• Comparative Ex. No. | | | |
|---|---|---|---|---|---|---|
| | | | Comparative Ex. 14 | Comparative Ex. 15 | Comparative Ex. 16 | Comparative Ex. 17 |
| Water Repellent Composition | Polyurethane Resin Composition | Production Ex. 1 (First Polyurethane Resin Composition) | 90 | — | — | — |
| | | Production Ex. 2 (Second Polyurethane Resin Composition) | — | 90 | — | — |
| | | Production Ex. 3 (Third Polyurethane Resin Composition) | — | — | 90 | — |
| | Non-Fluorine Water Repellent Compound | Production Ex. 4 | — | — | — | 50 |
| | | Production Ex. 5 | — | — | — | 50 |
| | | Production Ex. 6 | — | — | — | — |
| | | Production Ex. 7 | — | — | — | — |
| | | Dendrimer Aqueous Dispersion Liquid | — | — | — | — |
| | Silicone Polymer | Dimethylpolysiloxane Aqueous Dispersion Liquid | — | — | — | — |
| | | Silicone Polymer of Production Ex. 8 | 10 | 10 | 10 | — |
| | Wax | Wax of Production Ex. 9 | — | — | — | — |
| | Blocked Isocyanate Compound | | — | — | — | — |
| Evaluation | Water Repellency | Water Repellency Evaluation by Spraying Method | Urethane/Polyester Mixed Cloth | 70 | 70 | 70 | 70 |
| | | | Urethane/Nylon Mixed Cloth | 70 | 70 | 70 | 70 |
| | | | Polyester Cloth | 80 | 80 | 80 | 80 |
| | | | Nylon Cloth | 80 | 80 | 80 | 80 |

TABLE 5-continued

|  |  |  | | | | |
|---|---|---|---|---|---|---|
| Amount of Water Leakage (ml) | Urethane/Polyester Mixed Cloth | | 17 | 20 | 29 | 23 |
| | Urethane/Nylon Mixed Cloth | | 18 | 22 | 30 | 25 |
| Washing Durability | Polyester Cloth | Before Washing | — | — | — | — |
| | | After Washing 20 times | — | — | — | — |
| | Nylon Cloth | Before Washing | — | — | — | — |
| | | After Washing 20 times | — | — | — | — |

TABLE 6

| | | | Ex. No. | | | |
|---|---|---|---|---|---|---|
| | | | Ex. 31 | Ex. 32 | Ex. 33 | Ex. 34 |
| Polyurethane Resin Composition | Production Ex. 1 (First Polyurethane Resin Composition (Solid Content Concentration of 20% by mass)) | | 28 | 28 | 28 | 28 |
| Non Fluorine Water Repellent Compound | Long-Chain Aliphatic Hydrocarbon Group-Containing (Meth)Acrylate | Stearyl Acrylate | 34 | 51 | 17 | 34 |
| | Amide Group-Containing Monomer | Stearyl Group-Containing Amide Acrylate | — | — | 17 | — |
| | Non-Fluorine Copolymerizable Monomer | Vinyl Chloride | 17 | — | 17 | 17 |
| Surfactant | Sorbitan Fatty Acid Ester | | 1.7 | 1.7 | 1.7 | 1.7 |
| Liquid Solution | Pure Water | | 113 | 113 | 113 | 113 |
| | Water-Soluble Glycol-Based Solvent | | 25.5 | 25.5 | 25.5 | 25.5 |
| Silicone Polymer | Silicone Polymer of Production Ex. 8 (Solid Content Concentration of 30% by mass) | | 11 | 11 | 11 | 11 |
| Emulsifier | Cationic Emulsifier | | 1.7 | 1.7 | 1.7 | 1.7 |
| | Polyoxyethylene Alkyl Ether | | 5.1 | 5.1 | 5.1 | — |
| | Reactive Emulsifier | Polyoxyethylene Alkylphenol | — | — | — | 5.1 |
| Polymerization Initiator | Azo Group-Containing Water-Soluble Initiator | | 0.85 | 0.85 | 0.85 | 0.85 |
| Chain Transfer Agent | Lauryl Mercaptan | | 0.17 | 0.17 | 0.17 | 0.17 |

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The water repellent composition and the method for producing a water repellent composition of the present invention can be used for various industrial products, and can be, for example, preferably used for applications of surface treatment agents. The fiber product of the present invention can be preferably used in the production of various industrial products.

The invention claimed is:
1. A water repellent composition comprising:
a polyurethane resin compound, a non-fluorine water repellent compound, a surfactant, and a liquid medium, wherein
the polyurethane resin compound includes
(A) a first polyurethane resin compound which is a reaction product of
a first aliphatic polyisocyanate derivative having an average number of isocyanate groups of 2 or more,
a first long-chain active hydrogen compound including a hydrocarbon group having 12 or more and 30 or less carbon atoms and an active hydrogen group in combination,
a cationic active hydrogen compound including an active hydrogen group and a cationic group in combination, and
an acid compound capable of a salt with the cationic group, and
a concentration of the hydrocarbon group in the first polyurethane resin compound is 30% by mass or more and 85% by mass or less.
2. The water repellent composition according to claim 1, wherein
a mixing ratio of the non-fluorine water repellent compound with respect to 100 parts by mass of the total amount of the polyurethane resin compound and the non-fluorine water repellent compound is 0.1 parts by mass or more and 99 parts by mass or less.
3. The water repellent composition according to claim 1, wherein
the non-fluorine water repellent compound is a polymer including a constituent unit derived from a long-chain aliphatic hydrocarbon group-containing (meth) acry- late shown by the following formula (1) and/or an amide group-containing monomer shown by the following formula (2):

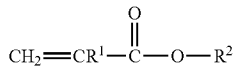
(1)

in the above-described formula (1), $R^1$ represents a hydrogen atom or a methyl group, and $R^2$ represents a straight-chain or branched long-chain aliphatic hydrocarbon group having 18 or more and 30 or less carbon atoms,

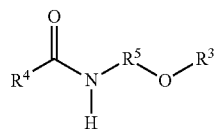
(2)

in the above-described formula (2), $R^3$ represents an organic residue having an ethylenically unsaturated double bond group, $R^4$ represents a monovalent hydrocarbon group having 7 or more and 30 or less carbon atoms, and $R^5$ represents a divalent hydrocarbon group having 1 or more and 5 or less carbon atoms.

4. The water repellent composition according to claim 3, wherein
the non-fluorine water repellent compound is a polymer including a constituent unit derived from a reactive emulsifier.

5. The water repellent composition according to claim 4, wherein
the reactive emulsifier is represented by the following formula (3)

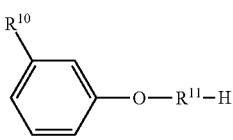
(3)

in the above-described formula (3), $R^{10}$ represents an organic residue having an ethylenically unsaturated double bond group having 12 or more and 20 or less carbon atoms, and $R^{11}$ represents an oxyalkylene group having 2 or more and 10 or less carbon atoms.

6. The water repellent composition according to claim 1, wherein
the non-fluorine water repellent compound is a dendrimer-based water repellent.

7. The water repellent composition according to claim 1 comprising:
at least one or more kinds selected from the group consisting of a blocked isocyanate compound, a silicone polymer, and a wax.

8. The water repellent composition according to claim 1, wherein
the first aliphatic polyisocyanate derivative includes an isocyanurate derivative of an aliphatic polyisocyanate.

9. The water repellent composition according to claim 1, wherein
in the cationic active hydrogen compound of the first polyurethane resin compound,
the cationic group is a tertiary amino group,
the active hydrogen group is a hydroxyl group, and
the cationic active hydrogen compound has two or more hydroxyl groups per molecule.

10. A method for producing a water repellent composition, the water repellent composition according to claim 3,
producing a non-fluorine water repellent compound by polymerizing a monomer component in the presence of a polyurethane resin compound, a surfactant, and a liquid medium.

11. A fiber product being a water repellent treatment product by the water repellent composition according to claim 1.

* * * * *